US012748850B2

(12) United States Patent
Gupta

(10) Patent No.: US 12,748,850 B2
(45) Date of Patent: Sep. 29, 2026

(54) APPLICATION AWARE SOFTWARE ASSET INVENTORY

(71) Applicant: Virsec Systems, Inc., San Jose, CA (US)

(72) Inventor: Satya V. Gupta, Dublin, CA (US)

(73) Assignee: Virsec Systems, Inc., San Jose, CA (US)

( * ) Notice: Subject to any disclaimer, the term of this patent is extended or adjusted under 35 U.S.C. 154(b) by 711 days.

(21) Appl. No.: 17/646,622

(22) Filed: Dec. 30, 2021

(65) Prior Publication Data

US 2022/0207151 A1 Jun. 30, 2022

Related U.S. Application Data

(60) Provisional application No. 63/155,466, filed on Mar. 2, 2021, provisional application No. 63/132,894, filed on Dec. 31, 2020.

(30) Foreign Application Priority Data

Jan. 18, 2021 (IN) ............................. 202141002208

(51) Int. Cl.
*G06F 9/44* (2018.01)
*G06F 21/57* (2013.01)

(52) U.S. Cl.
CPC ...... *G06F 21/577* (2013.01); *G06F 2221/033* (2013.01)

(58) Field of Classification Search
CPC ........ G06F 8/60; G06F 8/70; G06F 2221/033; G06F 21/563; G06F 9/451;
(Continued)

(56) References Cited

U.S. PATENT DOCUMENTS 6,321,334 B1 11/2001 Jerger et al.
7,181,731 B2 * 2/2007 Pace ......................... G06F 8/60
717/136

(Continued)

FOREIGN PATENT DOCUMENTS

WO 2015/007166 A1 1/2015
WO 2016/130372 A1 8/2016

(Continued)

OTHER PUBLICATIONS

"CAPEC—Common Attack Pattern Enumeration and Classification", (CAPEC(Trademark)), Available on https://capec.mitre.org, Jan. 2, 2022, 2 pages.

(Continued)

*Primary Examiner* — Chuck O Kendall
(74) *Attorney, Agent, or Firm* — Hamilton, Brook, Smith & Reynolds, P.C.

(57) ABSTRACT

Embodiments create application-aware software asset inventories for software assets deployed upon computer networks associated with organizations. An example embodiment extracts configuration information pertaining to an application installed on a workload deployed upon a network. In turn, an application topology file is constructed from the extracted configuration information. The constructed application topology file serves as an application-aware software asset inventory wherein information pertaining to identities, locations, and configurations of such software assets is organized and stored.

21 Claims, 17 Drawing Sheets

(58) Field of Classification Search
CPC ............... G06F 9/44589; G06F 9/4881; G06F 2221/2129; G06F 9/44; G06F 16/22; G06F 9/4843; G06F 2009/45575; G06F 21/30; G06F 11/3058; G06F 9/5088; G06F 11/004; G06F 9/45529; G06F 3/0647; G06F 16/156; G06F 16/2246; G06F 21/577; H04L 41/0853
USPC .................................................. 717/102–109
See application file for complete search history.

(56) References Cited

U.S. PATENT DOCUMENTS

| | | | |
|---|---|---|---|
| 7,343,626 | B1 | 3/2008 | Gallagher |
| 8,347,267 | B2 | 1/2013 | Givoni et al. |
| 8,549,591 | B2 | 10/2013 | Vidal |
| 9,246,935 | B2 | 1/2016 | Lietz et al. |
| 9,374,390 | B1 | 6/2016 | Teal et al. |
| 9,418,230 | B2 | 8/2016 | Archer et al. |
| 9,501,650 | B2 | 11/2016 | Chess et al. |
| 9,578,060 | B1 | 2/2017 | Brisebois et al. |
| 9,589,560 | B1 | 3/2017 | Vitaladevuni et al. |
| 10,116,681 | B2 | 10/2018 | Cornell et al. |
| 10,120,997 | B2 | 11/2018 | Eshkenazi et al. |
| 10,354,074 | B2 | 7/2019 | Gupta |
| 10,387,659 | B1 | 8/2019 | Youngberg et al. |
| 10,395,041 | B1 | 8/2019 | Youngberg et al. |
| 10,447,730 | B2 | 10/2019 | Gupta |
| 10,467,419 | B1 | 11/2019 | Youngberg et al. |
| 10,963,565 | B1 | 3/2021 | Xu et al. |
| 11,263,268 | B1 * | 3/2022 | Bourbie .............. G06F 16/2228 |
| 11,481,616 | B2 | 10/2022 | Spryn et al. |
| 11,615,061 | B1 | 3/2023 | Malik et al. |
| 11,907,378 | B2 | 2/2024 | Gupta |
| 12,158,958 | B2 | 12/2024 | Gupta et al. |
| 12,282,552 | B2 | 4/2025 | Gupta |
| 12,335,287 | B2 | 6/2025 | Gupta |
| 12,406,060 | B2 | 9/2025 | Gupta |
| 2003/0074207 | A1 * | 4/2003 | Pace ......................... G06F 8/60 709/204 |
| 2004/0046785 | A1 | 3/2004 | Keller |
| 2005/0066149 | A1 | 3/2005 | Kanade |
| 2005/0102534 | A1 | 5/2005 | Wong |
| 2007/0074169 | A1 | 3/2007 | Chess et al. |
| 2007/0199000 | A1 | 8/2007 | Shekhel et al. |
| 2008/0052527 | A1 | 2/2008 | Siedlarz |
| 2009/0119769 | A1 | 5/2009 | Ross et al. |
| 2012/0117644 | A1 | 5/2012 | Soeder |
| 2013/0111595 | A1 | 5/2013 | Amit et al. |
| 2014/0082735 | A1 | 3/2014 | Beskrovny et al. |
| 2014/0082739 | A1 | 3/2014 | Chess et al. |
| 2014/0165192 | A1 | 6/2014 | Zhu et al. |
| 2015/0215332 | A1 | 7/2015 | Curcic et al. |
| 2015/0261653 | A1 | 9/2015 | Lachambre et al. |
| 2015/0309813 | A1 | 10/2015 | Patel |
| 2016/0164891 | A1 | 6/2016 | Satish et al. |
| 2016/0241582 | A1 | 8/2016 | Boia et al. |
| 2016/0337400 | A1 | 11/2016 | Gupta |
| 2017/0270303 | A1 | 9/2017 | Roichman et al. |
| 2017/0288878 | A1 | 10/2017 | Lee et al. |
| 2017/0353434 | A1 | 12/2017 | Al-Saber et al. |
| 2018/0307831 | A1 | 10/2018 | Anand |
| 2018/0349602 | A1 | 12/2018 | Johns |
| 2019/0138725 | A1 | 5/2019 | Gupta |
| 2019/0286833 | A1 | 9/2019 | Takumi et al. |
| 2019/0377877 | A1 | 12/2019 | Johns |
| 2020/0004963 | A1 | 1/2020 | Zheng et al. |
| 2020/0042714 | A1 | 2/2020 | Gupta |
| 2020/0065166 | A1 * | 2/2020 | Myneni ................. G06F 9/5061 |
| 2020/0097662 | A1 | 3/2020 | Hufsmith et al. |
| 2020/0134193 | A1 | 4/2020 | Youngberg et al. |
| 2020/0134194 | A1 | 4/2020 | Youngberg et al. |
| 2020/0134195 | A1 | 4/2020 | Youngberg et al. |
| 2020/0167477 | A1 | 5/2020 | Ionescu et al. |
| 2020/0336507 | A1 | 10/2020 | Lee et al. |
| 2021/0086089 | A1 | 3/2021 | Pardeshi et al. |
| 2021/0099483 | A1 | 4/2021 | Shukla |
| 2021/0160273 | A1 | 5/2021 | Choi et al. |
| 2022/0046031 | A1 | 2/2022 | Kaidi |
| 2022/0067174 | A1 | 3/2022 | Gupta |
| 2022/0116411 | A1 | 4/2022 | Melicher et al. |
| 2022/0147635 | A1 | 5/2022 | Copty et al. |
| 2022/0198025 | A1 | 6/2022 | Gupta et al. |
| 2022/0210180 | A1 | 6/2022 | Gupta |
| 2022/0214928 | A1 | 7/2022 | Gupta et al. |
| 2022/0222338 | A1 | 7/2022 | Gupta |
| 2022/0391506 | A1 | 12/2022 | Gupta |
| 2023/0004652 | A1 | 1/2023 | Gupta |
| 2024/0314168 | A1 | 9/2024 | Cohen |
| 2025/0068726 | A1 | 2/2025 | Gupta et al. |

FOREIGN PATENT DOCUMENTS

| | | | |
|---|---|---|---|
| WO | 2020/026228 | A1 | 2/2020 |
| WO | 2022/047245 | A1 | 3/2022 |
| WO | 2022/147474 | A1 | 7/2022 |
| WO | 2022/147478 | A1 | 7/2022 |
| WO | 2022/155685 | A1 | 7/2022 |
| WO | 2022/155687 | A1 | 7/2022 |
| WO | 2022/246436 | A1 | 11/2022 |
| WO | 2022/246437 | A1 | 11/2022 |
| WO | 2023/133586 | A1 | 7/2023 |

OTHER PUBLICATIONS

"CAPEC View: Mechanisms of Attack", View ID: 1000, (Version 3.6), Available online https://capec.mitre.org/data/definitions/1000.html, Jan. 2, 2022, 2 pages.

"Configuration Management Database (CMDB)", 2023, 15 pages.

"CWE View: Software Development" View ID: 699, Individual Dictionary Definition (4.6), Available on https://cwe.mitre.org/data/definitions/699.html, Jan. 2, 2022, 2 pages.

"Integrated Risk Management (IRM)", Gartner Glossary, Available on https://www.gartner.com/en/information-technology/glossary/integrated-risk-management-irm, Jan. 2, 2022, 5 pages.

"javap—The Java Class File Disassembler", Oracle, Java SE Documentation, Available on https://docs.oracle.com/javase/7/docs/technotes/tools/windows/javap.html, Jan. 2, 2022, 3 pages.

"The Shadow Brokers", Wikipedia, Available on https://en.wikipedia.org/wiki/The_Shadow_Brokers, Jan. 2, 2022, 8 pages.

"Windows Print Spooler Remote Code Execution Vulnerability", Security Vulnerability, CVE-2021-34527, Available on https://msrc.microsoft.com/update-guide/vulnerability/CVE-2021-34527#title, Jun. 13, 2023, 1 page.

Caputo, D., et al: "Droids in Disarray: Detecting Frame Confusion in Hybrid Android Apps", Jun. 11, 2019 (Jun. 11, 2019), Advances in Databases and Information Systems; [Lecture Notes in Computer Science; Lect.Notes Computer], Springer International Publishing, Cham, pp. 121-139.

Chen et al., "Automated system change discovery and management in the cloud", IBM Journal of Research and Development, vol. 60, No. 2-3, Mar. 1, 2016, pp. 2:1-2:10.

Chen et al., "Detecting and Identifying System Changes in the Cloud via Discovery by Example", 2014 IEEE International Conference on Big Data, Oct. 27, 2014, pp. 90-99.

Chen, Lu., et al., "Research on Mobile Application Local Denial of Service Vulnerability Detection Technology Basec on Rule Matching", 2019 IEEE International Conference on Energy Internet (ICEI), IEEE, May 27, 2019 (May 27, 2019), pp. 585-590.

David Stahl, "What's an RFC and what can they do for me?", Global Knowledge, Available on https://www.globalknowledge.com/us-en/resources/resource-library/articles/whats-an-rfc-and-what-can-they-do-for-me/, Sep. 16, 2009, 2 pages.

International Search Report and Written Opinion received for PCT Patent Application No. PCT/US2021/048077, mailed on Dec. 20, 2021, 11 pages.

International Search Report and Written Opinion received for PCT Patent Application No. PCT/US2021/073197, mailed on Mar. 21, 2022, 10 pages.

(56) References Cited

OTHER PUBLICATIONS

International Search Report and Written Opinion received for PCT Patent Application No. PCT/US2021/073201, mailed on Apr. 7, 2022, 10 pages.
International Search Report and Written Opinion received for PCT Patent Application No. PCT/US2022/070236, mailed on Apr. 8, 2022, 15 pages.
International Search Report and Written Opinion received for PCT Patent Application No. PCT/US2022/070240, mailed on Apr. 7, 2022, 17 pages.
International Search Report and Written Opinion received for PCT Patent Application No. PCT/US2022/072416, mailed on Sep. 8, 2022, 13 pages.
International Search Report and Written Opinion received for PCT Patent Application No. PCT/US2022/072417, mailed on Sep. 8, 2022, 15 pages.
Johns, M., et al., "XSSDS: Server-Side Detection of Cross-Site Scripting Attacks", Computer Security Applications Conference, 2008. Acsac, Dec. 8, 2008, pp. 335-344.
Koutroumpouchos, K., et al., "ObjectMap: detecting insecure object deserialization", PCI '19: Proceedings of the 23rd Pan-Hellenic Conference on Informatics, Nov. 28, 2019, pp. 67-72.
Prevelakis et al., "Sandboxing Applications", USENIX, The Advanced Computing Systems Association, Feb. 25, 2019, pp. 1-9.
Secure execution of privileged scripts ED-Darl Kuhn, ip.com, ip.com Inc., West Henrietta, Sep. 18, 2009, XP013134389.
Sun, F., et al., "Client-Side Detection of XSS Worms by Monitoring Payload Propagation", Advances In Databases And Information Systems, Sep. 21, 2009, pp. 539-554.
Xia, M. et al: "Effective Real-Time Android Application Auditing", 2015 IEEE Symposium on Security and Privacy, IEEE, May 17, 2015 (May 17, 2015), pp. 899-914.
Snow et al., "SHELLOS: Enabling Fast Detection and Forensic Analysis of Code Injection Attacks", USENIX Security Symposium, 2011, 16 pages.
"ATT&CK (Registered)", The Mitre, Available online at: < https://attack.mitre.org>, Sep. 14, 2023, 1 page.
"Welcome to YARA's documentation-yara 4.3.2 documentation" Available online at: <https://yara.readthedocs.io/en/stable/>, retrieved on Sep. 14, 2023, 4 pages.
International Search Report and Written Opinion received for PCT Patent Application No. PCT/US2023/060379, mailed on Apr. 19, 2023, 15 pages.
Yang Ji, "Efficient and refinable attack investigation," A Dissertation Presented to The Academic Faculty, Georgia Institute of Technology, Dec. 2019, pp. 123.
Dizdar, A. , "Why are SAST solutions not always the best option for AST?", Bright, Jan. 22, 2020, 10 pages.
Horvath, M., et al., "Magic Quadrant for Application Security Testing" Gartner Reprint, (33 pages) Apr. 29, 2020, 33 pages, retrieved from https://www.gartner.com/doc/reprints?id=1-1YWZKUB5&ct=200429&st=sb.
Potdar, S., "The Curious Case of False Positives in Application Security", Security Zone, May 13, 2019, 4 pages.
QwietAI "ShiftLeft Achieves Highest Ever SAST Score on OWASP Benchmark", Nov. 1, 2023, 7 pages, retrieved from https://qwiet.ai/news-press/shiftleft-achieves-highest-ever-sast-score-on-owasp-benchmark/.
Gowda et al., "False Positive Analysis of software vulnerabilities using Machine learning", 2018 IEEE International Conference on Cloud Computing in Emerging Markets (CCEM), 2018, 4 pages.
Ryutov et al., Integrated_access_control_and_intrusion_detection_for_Web_servers, IEEE Transactions on Parallel and Distributed Systems, vol. 14, No. 9 (Year: 2003).
Singh et al., Detection_amp_prevention_of_website_vulnerabilities_Current_scenario_and_future_trends, IEEE Xplore Compliant—Part No. CFP17AWO-ART, (Year: 2017).
"Application Control for Windows" Application Control for Windows Microsoft Learn; 3 pages, https://learn.microsoft.com/en-us/windows/security/application-security/application-control/windows-defender-application-control/, retrieved from Internet, Jun. 15, 2026.
"Carbon Black App Control Documentation" VMWare Docs 5 pages, https://docs.vmware.com/en/VMware-Carbon-Black-App-Control/index.html, retrieved from Internet, Jun. 15, 2026.
"Protect What Runs in the Cloud", 13 pages, https://www.aquaseccom/, retrieved from Internet, Jun. 15, 2026.
"SELinux" Security-Enhanced Linux, 11 pages, https://en.wikipedia.org/wiki/SELinux, retrieved from Internet, Jun. 15, 2026.
"The Falco Project" 3 pages, https://falco.org/docs/, retrieved from Internet, Jun. 15, 2026.
"Welcome to YARA's documentation"; 4 pages, https://yara.readthedocs.io/, retrieved from Internet, Jun. 15, 2026.
App Control and AppLocker Overview, Microsoft Learn "App Control for Business and AppLocker Overview", 3 pages, https://learn.microsoft.com/en-us/windows/security/threat-protection/windows-defender-application-control/wdac-and-applocker-overview; retrieved from Internet, Jun. 15, 2026.
https://owasp.org/www-project-modsecurity-core-rule-set/ Owasp Crs, Owasp Foundation "The 1st Line of Defense Against Web Application Attacks"; 4 pages, retrieved from Internet https://owasp.org/www-project-modsecurity-core-rule-set/, Jun. 15, 2026.

* cited by examiner

APPLICATION AWARE SOFTWARE ASSET INVENTORY

RELATED APPLICATIONS

This Application claims the benefit of U.S. Provisional Application No. 63/132,894, filed on Dec. 31, 2020, and U.S. Provisional Application No. 63/155,466, filed on Mar. 2, 2021.

This Application claims priority under 35 U.S.C. § 119 or 365 to India Application No. 202141002208, filed Jan. 18, 2021.

The entire teachings of the above Applications are incorporated herein by reference.

BACKGROUND

It is often useful to maintain an inventory of computing assets, and configuration details thereof, controlled and/or utilized by an organization. Various methods and tools exist for maintaining inventories of these assets and configuration details thereof, but these existing methods and tools are inadequate.

SUMMARY

Embodiments provide functionality to produce an application-aware inventory of software assets deployed on a computer network.

An example embodiment is directed to a method for producing an application-aware inventory of software assets deployed on a computer network. In an example implementation, the method begins by extracting configuration information pertaining to an application installed on a workload deployed upon a network. The configuration information includes identifications and parameters of supporting files coupled with a given executable file, or a constituent file thereof, associated with the application. The extracting includes: (i) recursively traversing import and export tables of the given executable file and of the supporting files and (ii) determining relationships therebetween. Next, an application topology file is constructed from the extracted configuration information. The application topology file includes a representation of the relationships between the given executable file, or constituent file thereof, and the supporting files. An application-aware inventory of software assets deployed on the network is thus created and augmented as updates thereto are identified.

In an example embodiment, the supporting files include libraries and scripts installed on the workload for use by the application. In such an embodiment, the libraries may include package files such as, for example RPM, DEB, or MSI files. In such an embodiment, the libraries may also include archive files, such as, for example, TAR, ZIP, or RAR files. In such an embodiment, the package files may be referred to as independent package files, and the supporting files further include dependent package files coupled with the independent package files, such that the dependent package files are also made subject to the extracting of configuration information as described above.

In an example embodiment, the parameters of supporting files include at least one of a version identifier, a path, and a checksum. Such a checksum may be configured to cover file types at least including executables, libraries, scripts, and configuration files, to name a few. In some embodiments, the configuration information further includes an allowlist. Such an allowlist includes an exception policy covering one or more program files, wherein the one or more program files include at least one of executable files and script files.

In another example embodiment, in the constructed application topology file, the relationships between the given executable file, or constituent file thereof, and the supporting files are represented in a tree structure.

In some embodiments, the given executable file is of at least one of a portable executable (PE) format and an executable and linkable (ELF) format. In yet other embodiments, the constituent file of the given executable file is an interpreted code file. In such embodiments, the method further includes reversing code of the interpreted code file prior to extracting the configuration information thereof.

In some embodiments, the workload includes multiple workloads deployed upon the network. In some embodiments, the application includes a plurality of applications associated with an organization, such as an enterprise, or a division thereof. In such embodiments, the method further includes recursively repeating the extracting to obtain configuration information for the plurality of applications. In such embodiments, elements of the obtained configuration information correspond to unique manifestations of package files and archive files associated with individual applications of the plurality of applications. In such embodiments, the method further includes updating the constructed application topology file to include representations of the configuration information for the plurality of applications. An application-aware inventory is thus produced for a plurality of software assets deployed upon workloads deployed in a network utilized by the organization.

In some embodiments, the method further includes recognizing a state of compromised security jeopardizing the application or an aspect thereof. In such embodiments, the state of compromised security may be identified by discovery of evidence of a vulnerability or of an imminent, presently occurring, or recently concluded attack on the application. In such embodiments, the method further includes examining the application topology file to determine one or more appropriate protection actions to launch in response to the recognized state of compromised security.

Another example embodiment is directed to a system for producing an application-aware inventory of software assets deployed on a computer network. In such an embodiment, the system includes a processor and a memory with computer code instructions stored thereon. In such an embodiment, the processor and the memory, with the computer code instructions, are configured to cause the system to extract configuration information pertaining to an application installed on a workload deployed upon a network. Such configuration information may include identifications and parameters of supporting files coupled with a given executable file, or a constituent file thereof, associated with the application. The extracting may include: (i) recursively traversing import and export tables of the given executable file and of the supporting files and (ii) determining relationships therebetween. In such embodiments, the processor may be further configured to construct an application topology file from the extracted configuration information. Such an application topology file may include a representation of the relationships between the given executable file, or constituent file thereof, and the supporting files. An application-aware inventory of software assets deployed on the network may thus be created by the system and augmented as updates thereto are identified.

Yet another example embodiment is directed to a computer program product for producing an application-aware inventory of software assets deployed on a computer network. In such an embodiment, the computer program product includes one or more non-transitory computer-readable storage devices and program instructions stored on at least one of the one or more storage devices. In such an embodiment, the program instructions, when loaded and executed by a processor, cause an apparatus associated with the processor to extract configuration information pertaining to an application installed on a workload deployed upon a network. The configuration information may include identifications and parameters of supporting files coupled with a given executable file, or a constituent file thereof, associated with the application. The extracting may include: (i) recursively traversing import and export tables of the given executable file and of the support files and (ii) determining relationships therebetween. In such an embodiment, the program instructions, when loaded and executed by the processor, cause an apparatus associated with the processor to construct an application topology file from the extracted configuration information. The application topology file may include a representation of the relationships between the given executable file, or constituent file thereof, and the supporting files. An application-aware inventory, of software assets deployed on the network, may thus be created upon execution of the program instructions of the computer program product.

It is noted that embodiments of the method, system, and computer program product may be configured to implement any embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

1. Introduction

Traditional Configuration Management Databases (CMDB) (described at https://old.wiki/index.php/CMDB_Data_Model) maintain a hardware and software-level inventory within a series of tables containing information identifying and pertaining to computing assets and business services controlled by a company, including configuration information of such assets.

Figure 1:
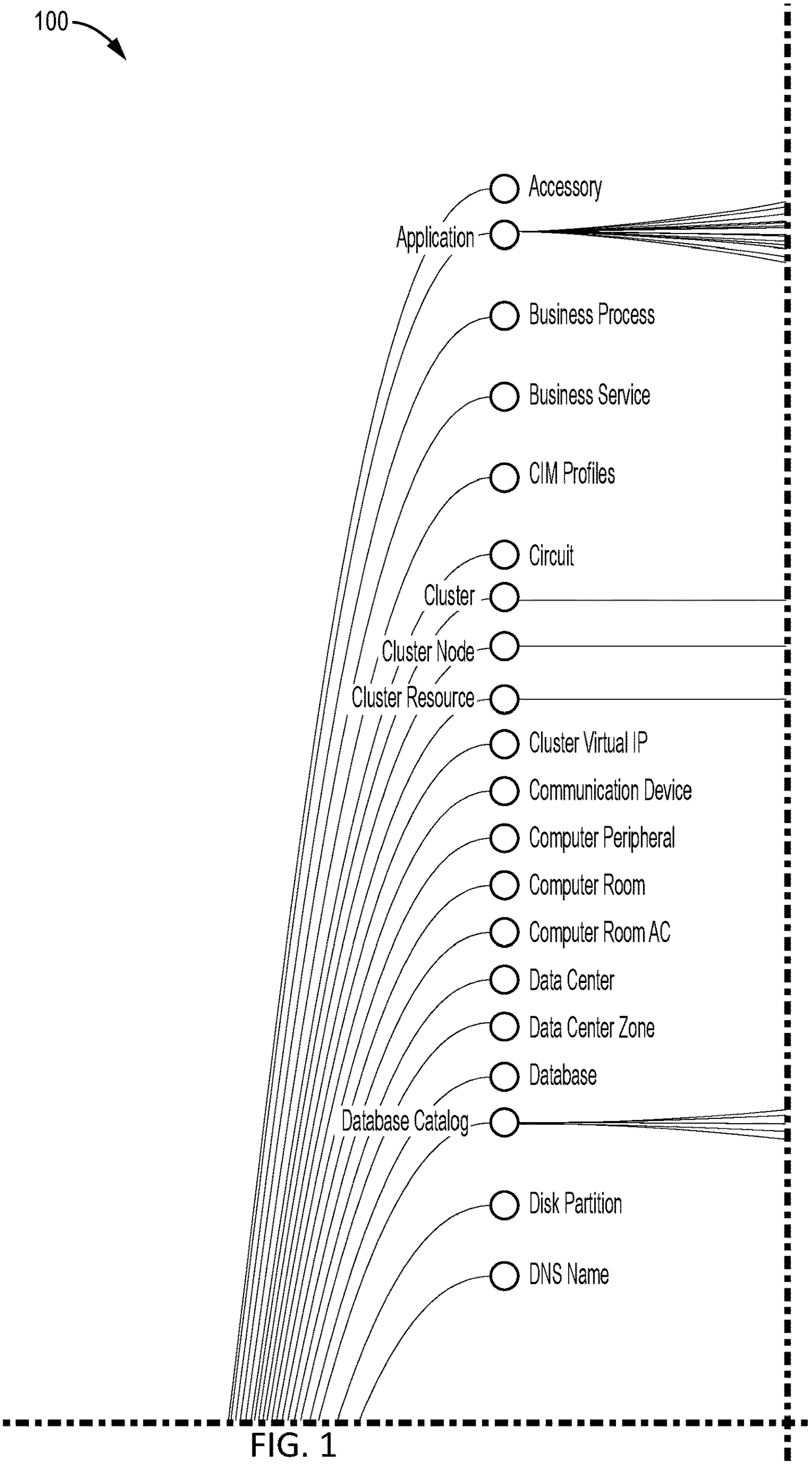
FIG. 1 is a tree diagram representing a computing asset inventory according to a traditional configuration management database standard.
Figure 1:
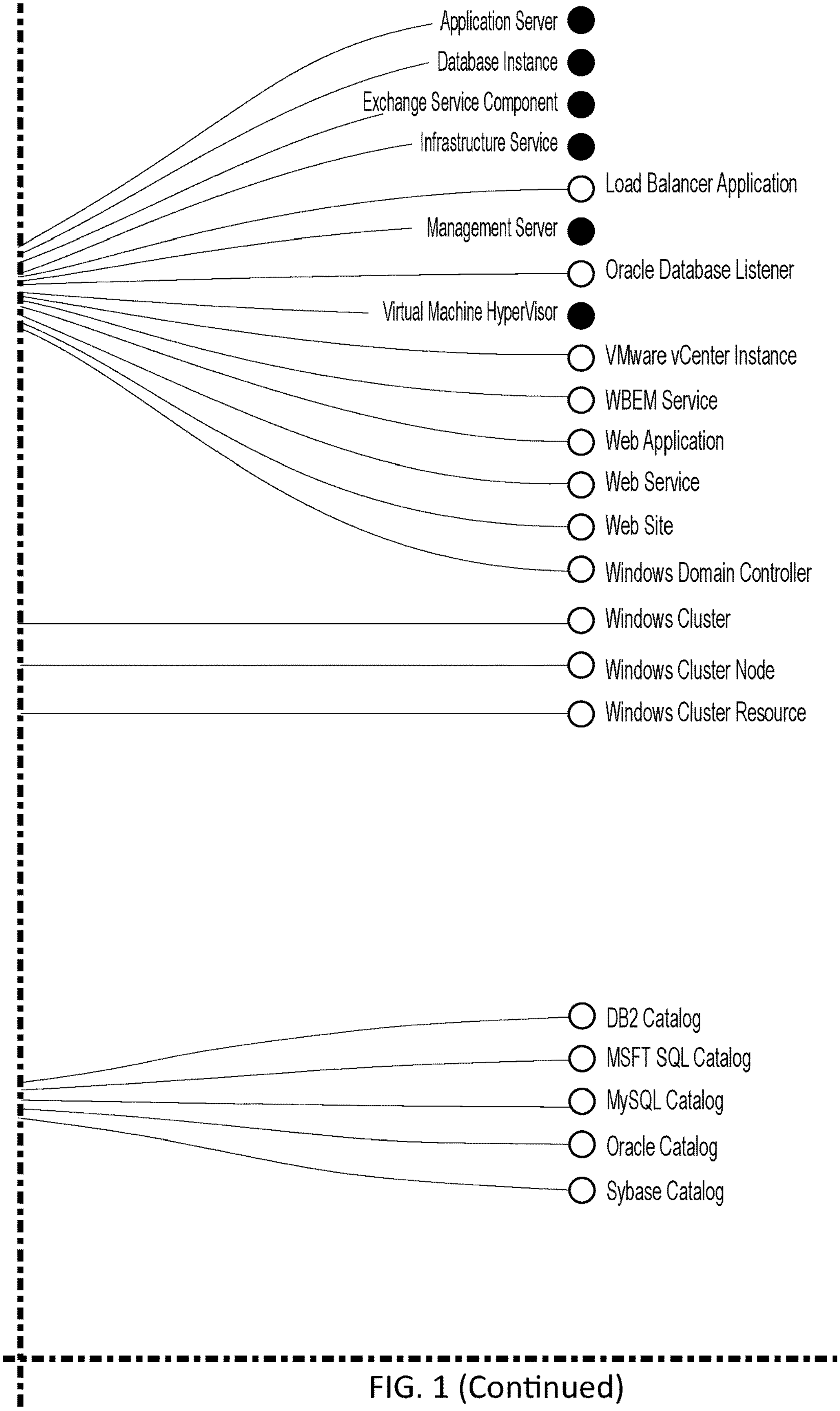
Figure 1:
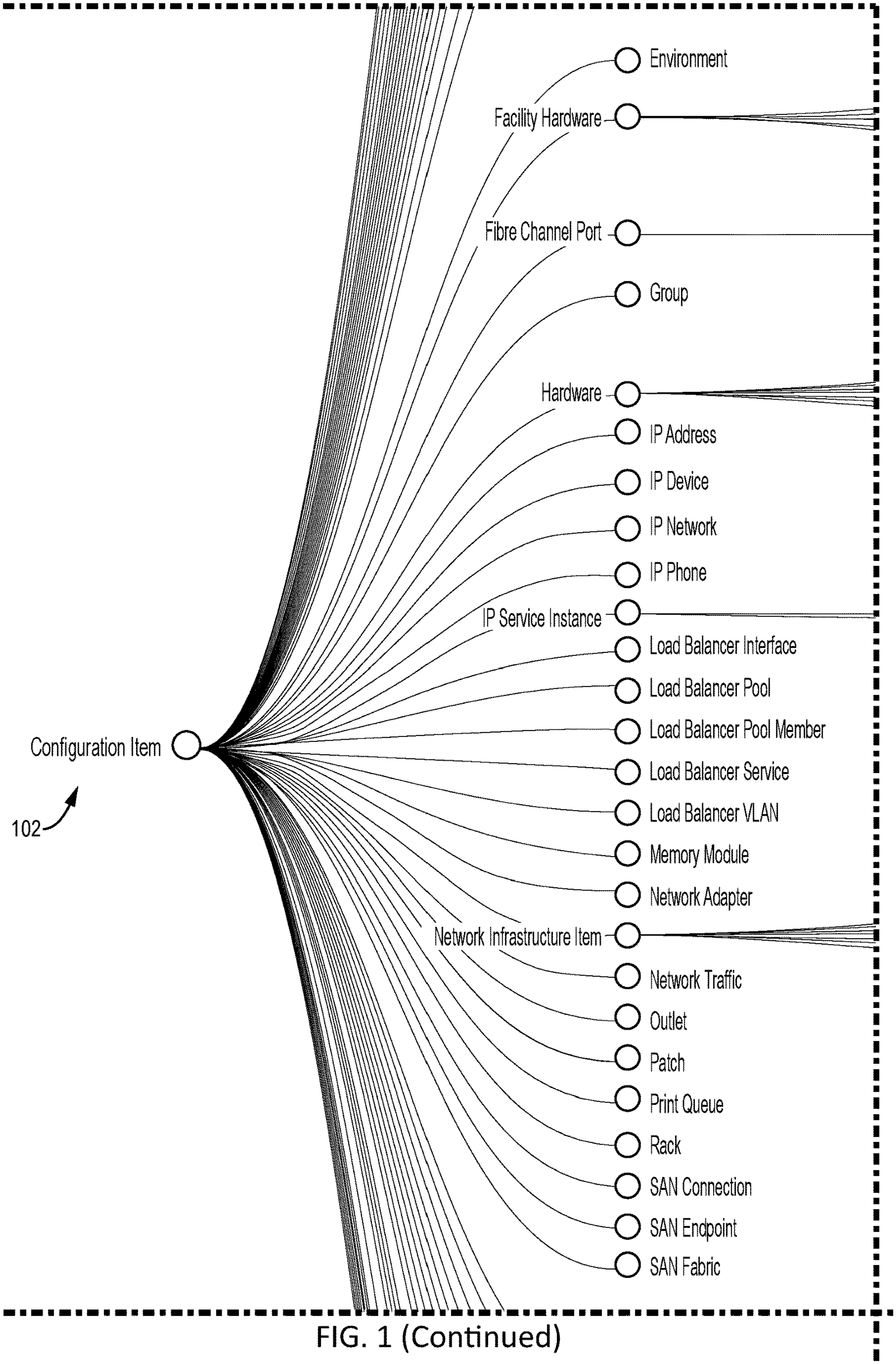
Figure 1:
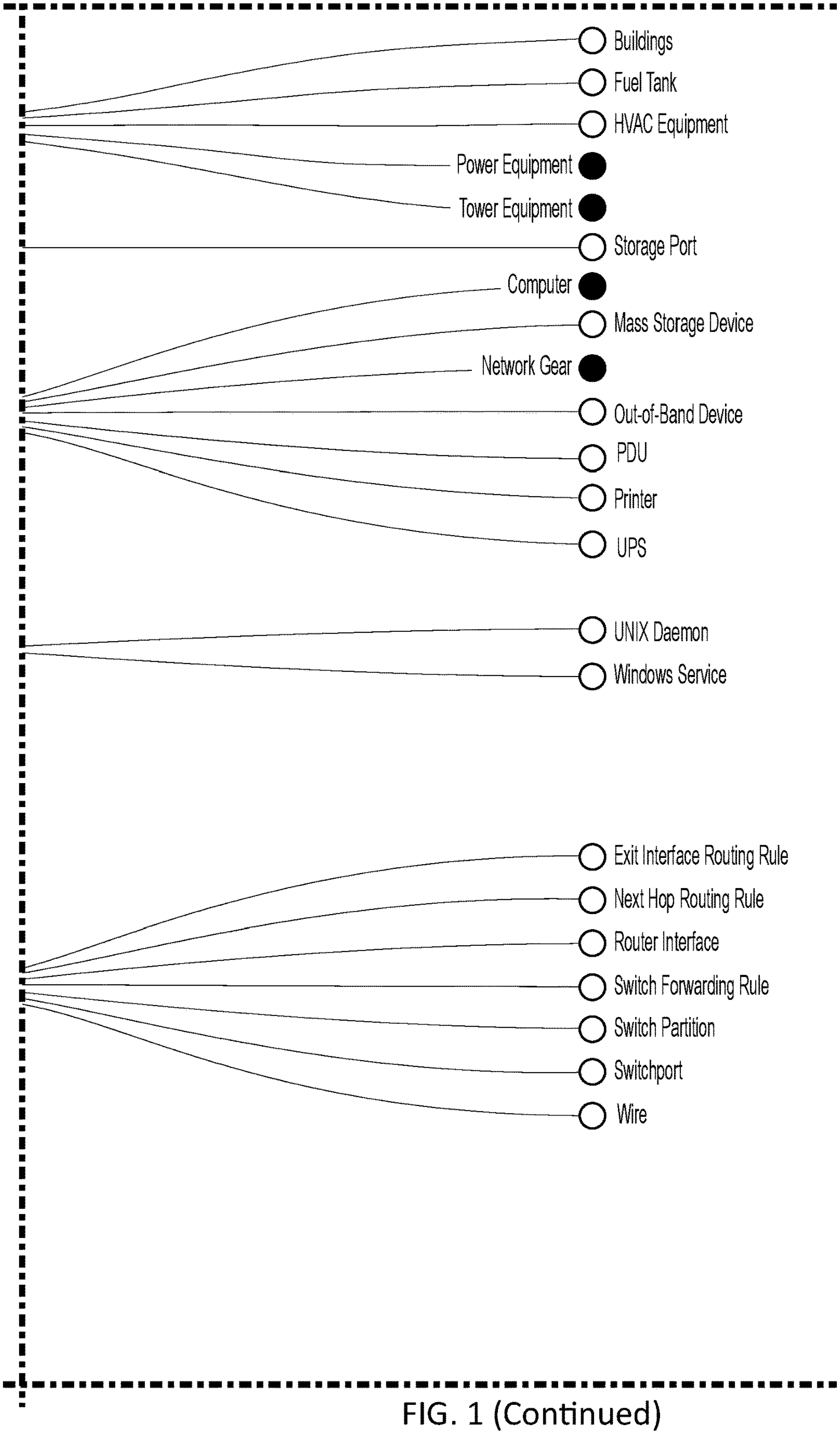
Figure 1:
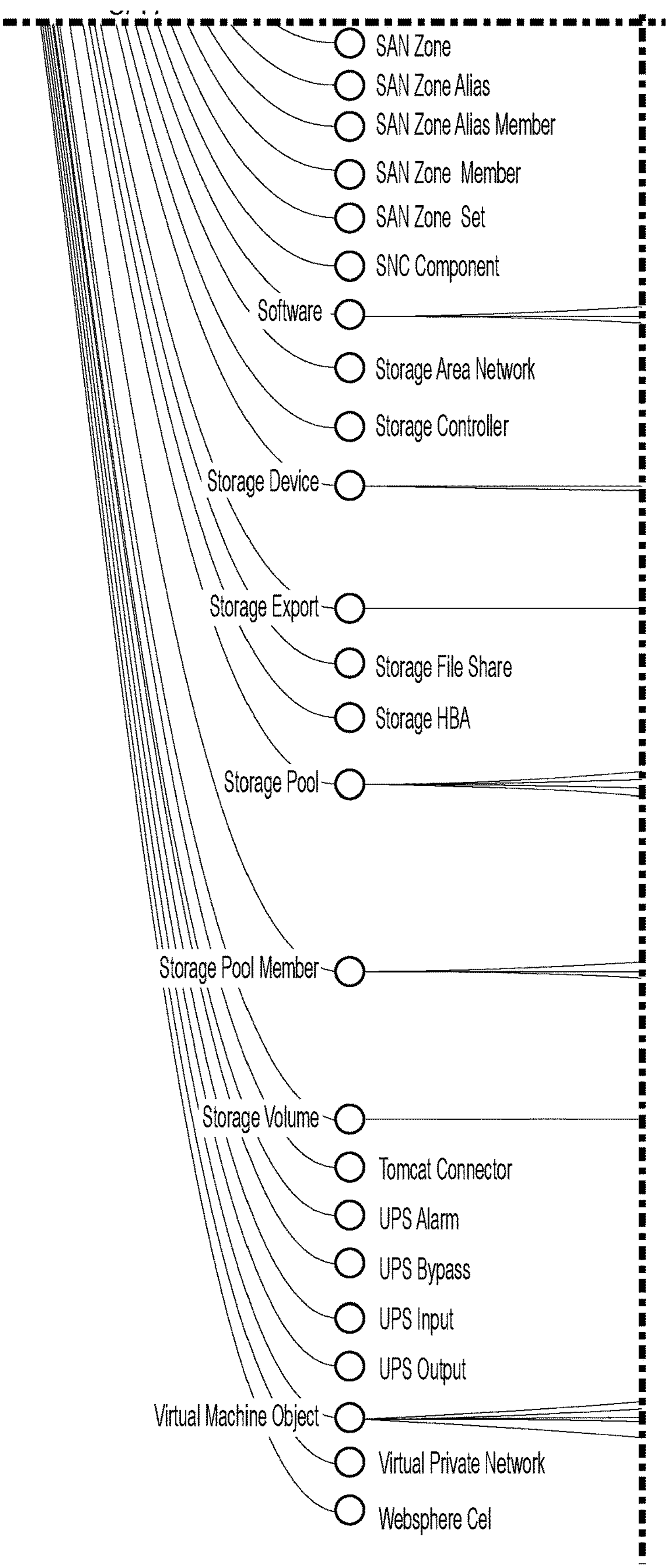
Figure 1:
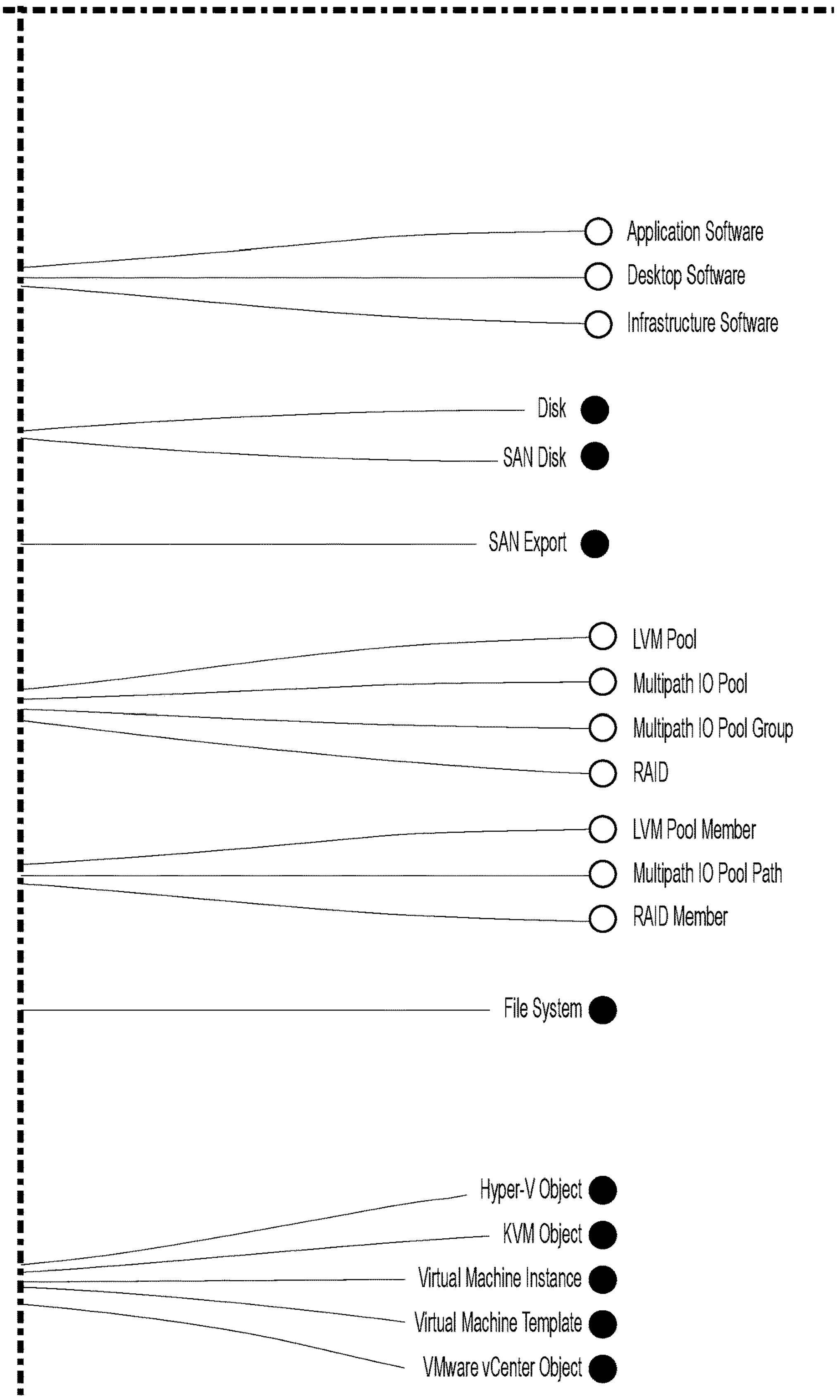

FIG. 1 is a tree diagram 100 showing example configuration items 102, such as computers and other devices on the network, software contracts and licenses, and business services, that may be represented in traditional CMDBs as described hereinabove.

As can be seen in FIG. 1, a major use of a CMDB is for information technology (IT) personnel, on behalf of an organization, e.g., an enterprise or a division thereof, to discover and provision computing assets of or for the organization according to information obtained from CMDB tables. IT may also use the obtained information to generate reports, or to drive a user interface (UI).

Unfortunately, the traditional CMDB representation described hereinabove is not drawn up with security in mind. It is possible to track physical assets via a traditional CMDB, but the CMDB representation is presently deficient in terms of tracking and securing software assets. Furthermore, in a CMDB, software services are simply enumerated, but the components that are responsible for providing those services are not mentioned in such a CMDB.

2. Application Service Instance (ASI) Breakdown

Figure 2:
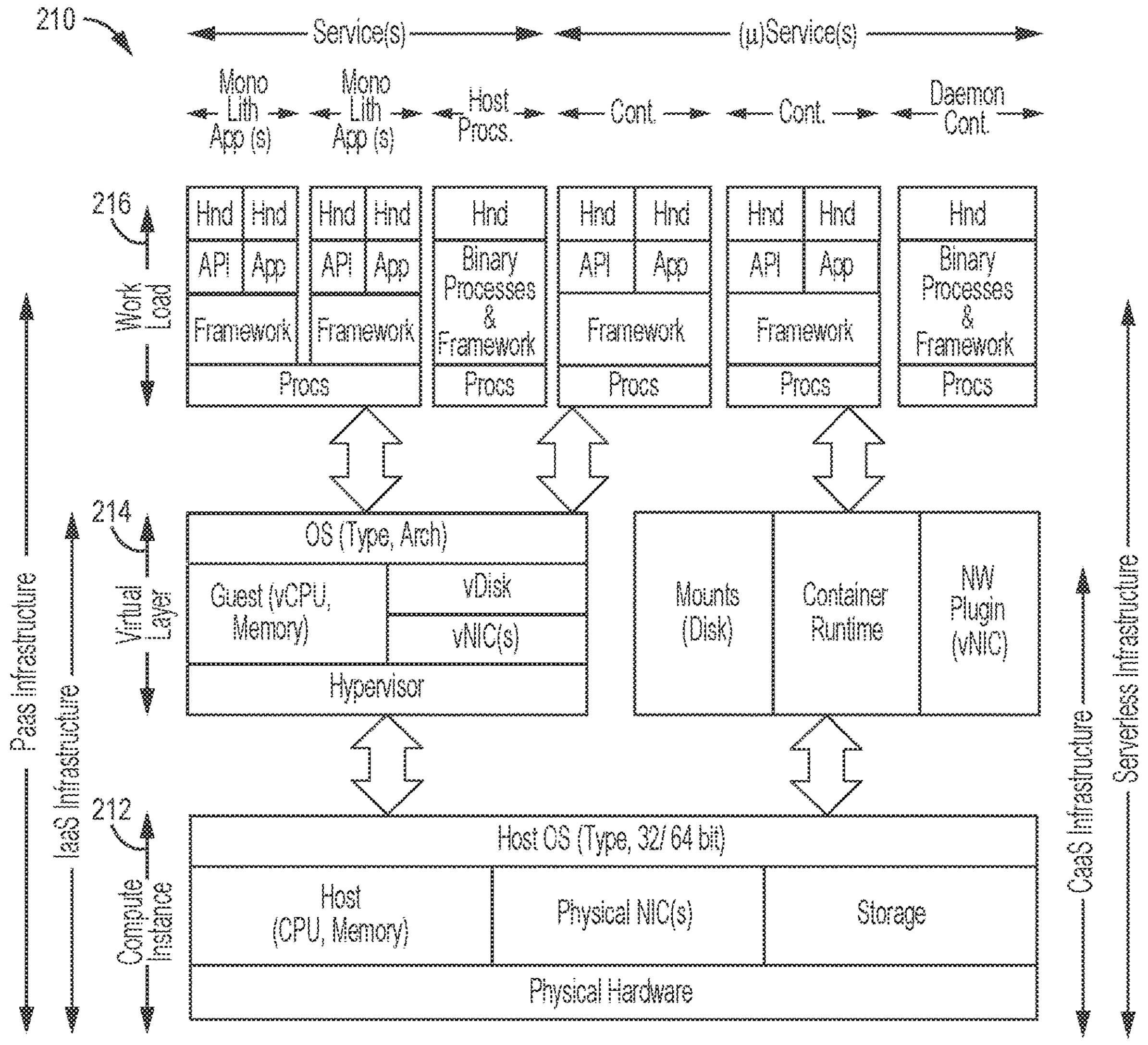
FIG. 2 is a block diagram depicting an application service instance configured to support embodiments.

FIG. 2 is a block diagram 210 depicting an example configuration of an application service instance (ASI). An ASI represents a host on which an application, or parts thereof, may run. An ASI can be broken down into three distinct layers: (a) a compute instance layer 212, (b) a virtualization layer (i.e., virtual layer) 214, and (c) a workload layer 216. The compute instance layer 212 may include respective representations of a processor (CPU), memory, and an operating system (OS) provided for use by the host as represented by the ASI. There may be, for example, one compute instance, one of four combinations of two modes of virtualization layer (i.e., 00, 01, 10 and 11), and one or more "services" or workloads running on the compute instance plus virtualization layer combinations of the host. The aforementioned layers 212, 214, 216 may be configured with individual components as shown in FIG. 2.

Data center or cloud providers provide different combinations of layers according to various ASI implementation types. For instance, an infrastructure as a service (IaaS) type of cloud provider provides the compute instance layer 212 and the virtualization layer 214, whereas the customer provides the workload 216 that will run on top. The customer is responsible for securing the workload 216 in the case of IaaS. Similarly, a platform as a service (PaaS) type of cloud provider is responsible for securing a framework deployed upon a workload 216 in addition to the compute instance layer 212 and virtualization layer 214, and the customer is only responsible for any applications, APIs, and handlers active on the workload 216.

3. Application Topology Extraction Tool

In some embodiments, an Application Topology Extraction (ATE) tool, such as those described in U.S. Provisional Application No. 63/155,466, filed on Mar. 2, 2021 and India, Application No. 202141002208, filed on Jan. 18, 2021, runs on an ASI and extracts configuration information, including information exemplified by FIG. 2, to be organized in a manner as portrayed in FIG. 2.

4. Securing Software Assets in an Application-Aware Manner

Embodiments of an application-aware security solution ensure that an application process operates in a secure manner and that an attacker cannot execute code of their choosing by infiltrating the application and making the infiltrated application perform operations that the developer of the application never intended for the application to do. To accomplish this task, embodiments serve to constrain the application to operate in a secure manner, with enough monitoring enabled to ensure that the application operates only within its own guardrails. Guardrails can be defined, for example, in terms of files, FIFOs, users, shared memory, IP v4/v6 connectivity, etc. Embodiments of the security solution are capable of reliable communication with workloads upon which applications are installed.

Figure 3:
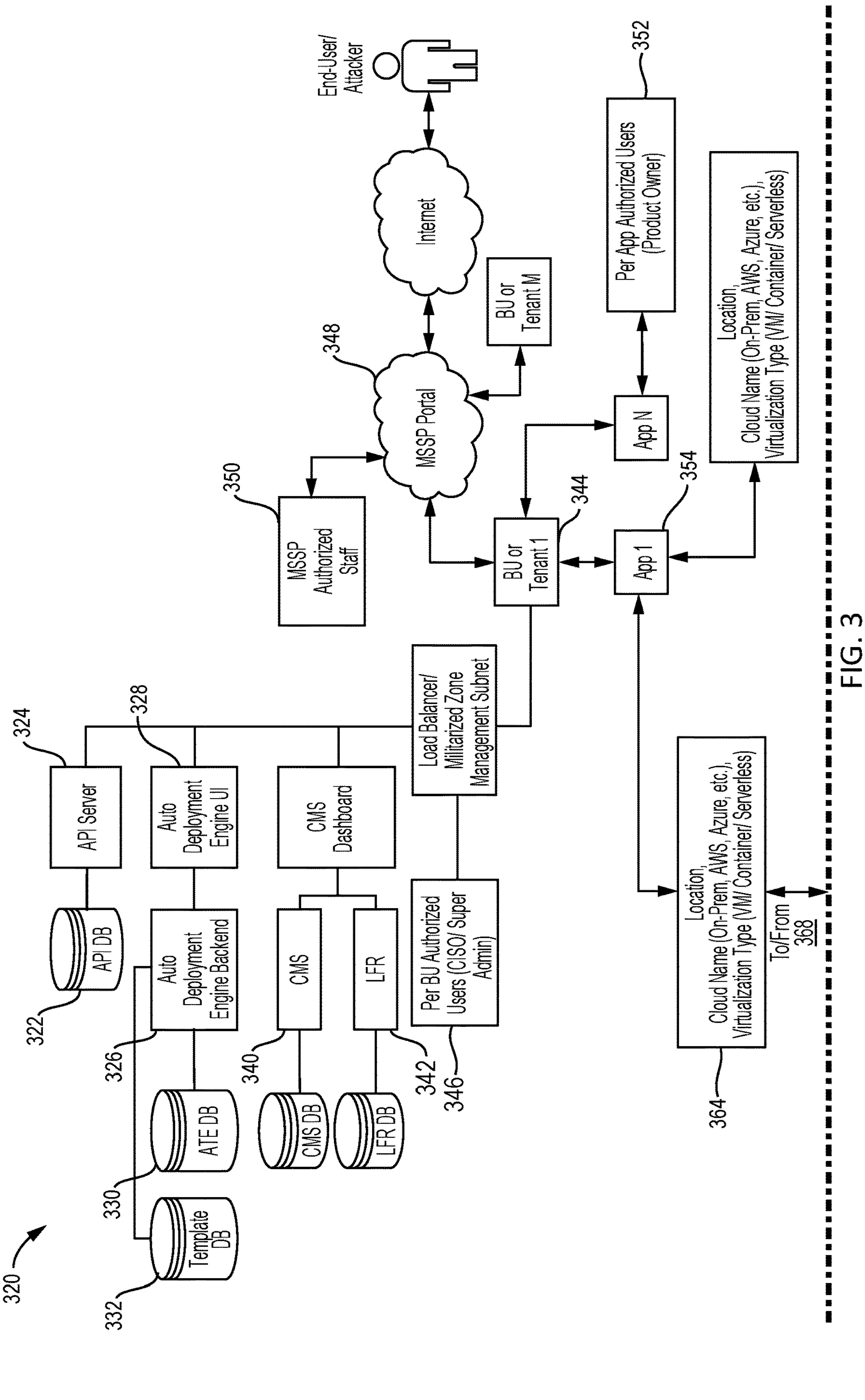
FIG. 3 is a block diagram representing various network, application, and security components that may be used to create an application-aware inventory of software assets according to an embodiment.
Figure 3:
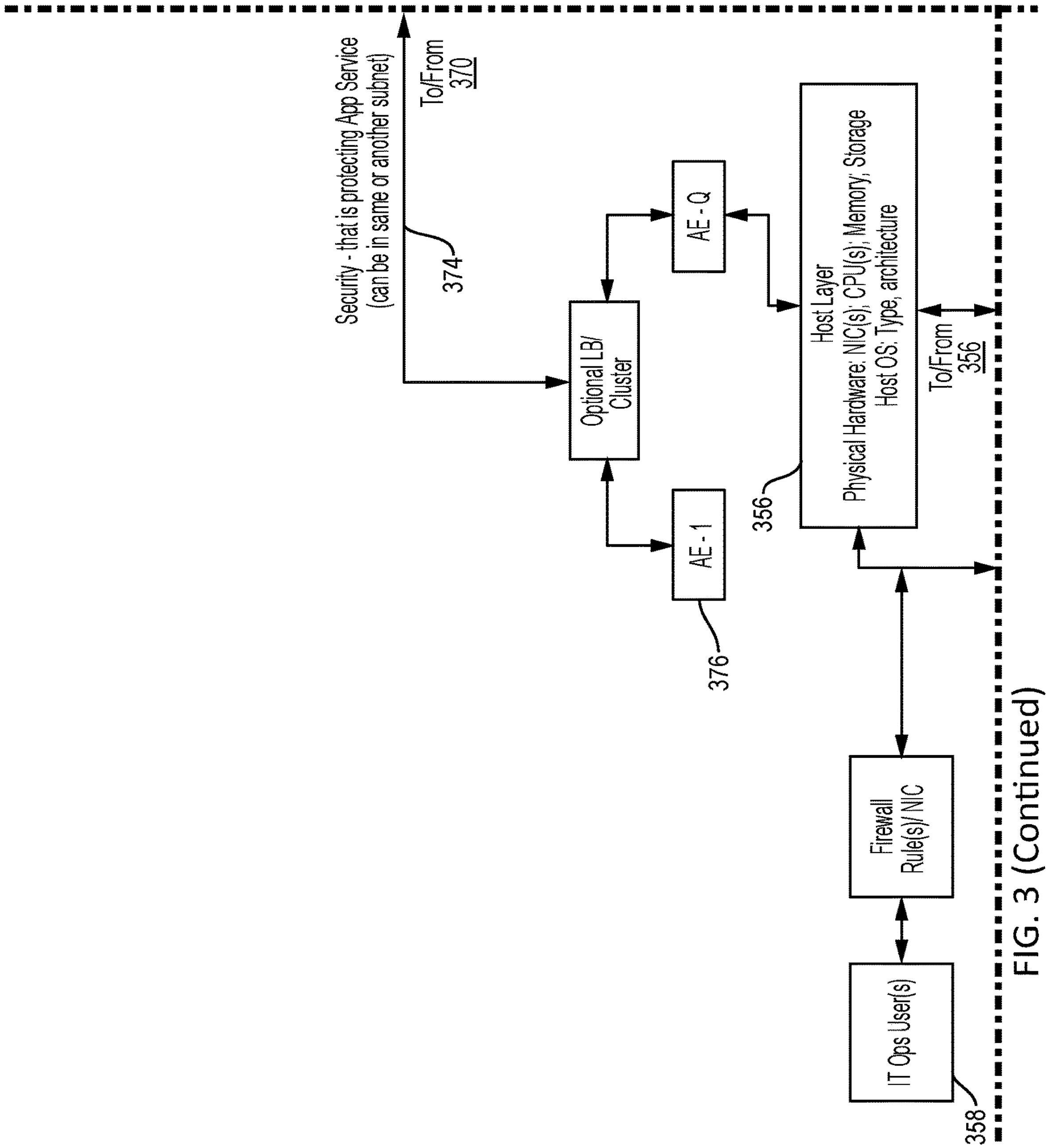
Figure 3:
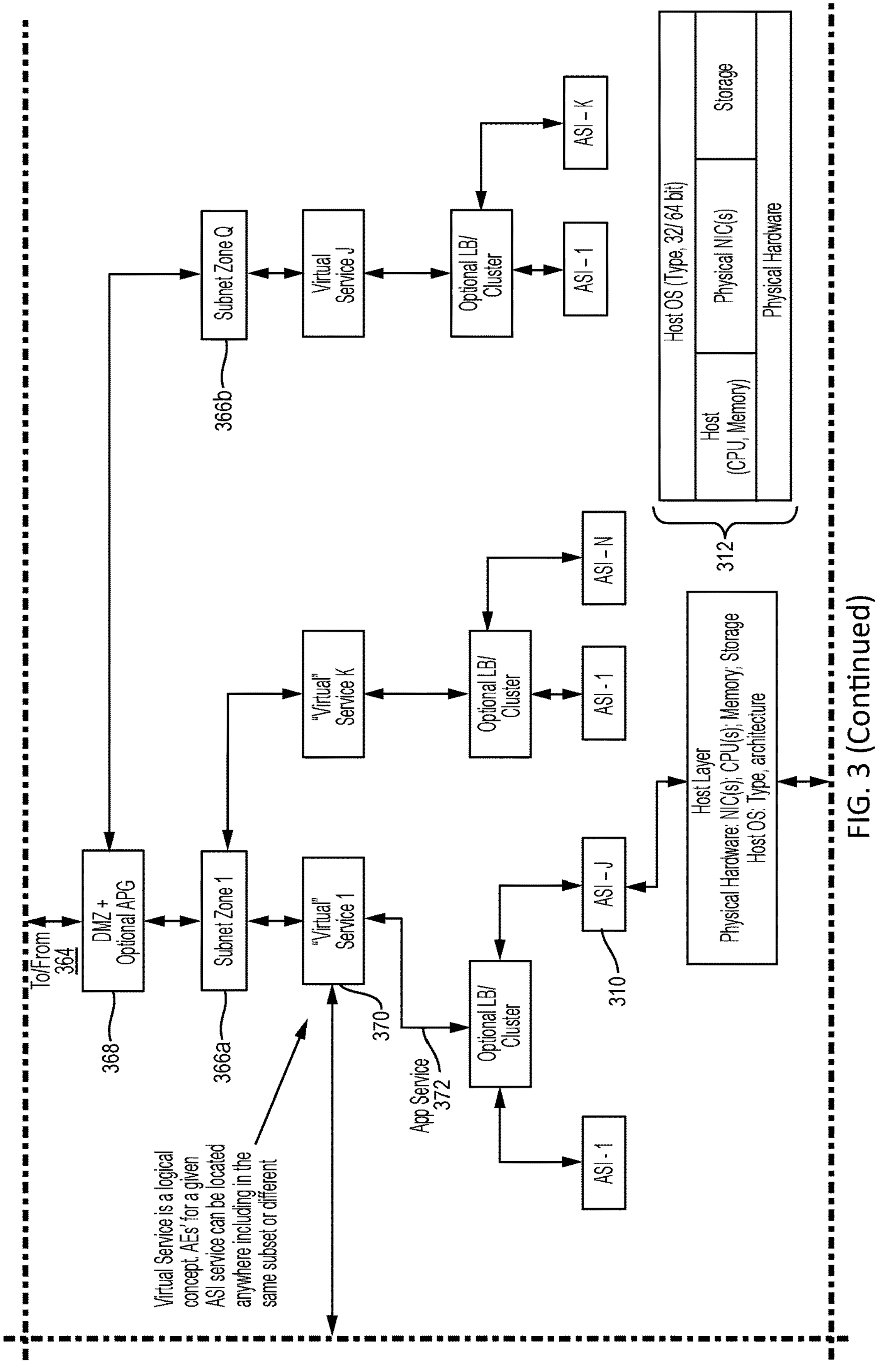
Figure 3:
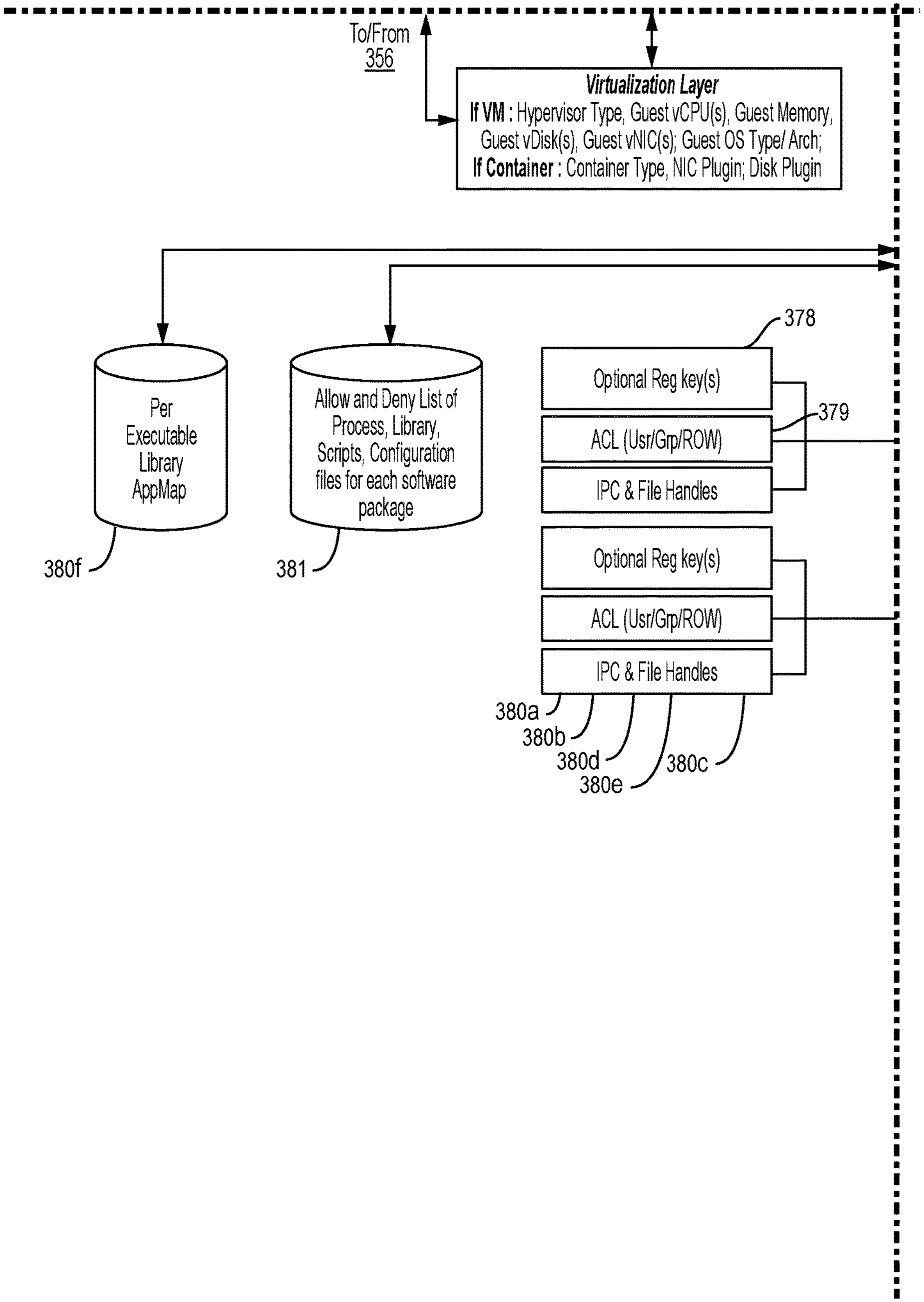
Figure 3:
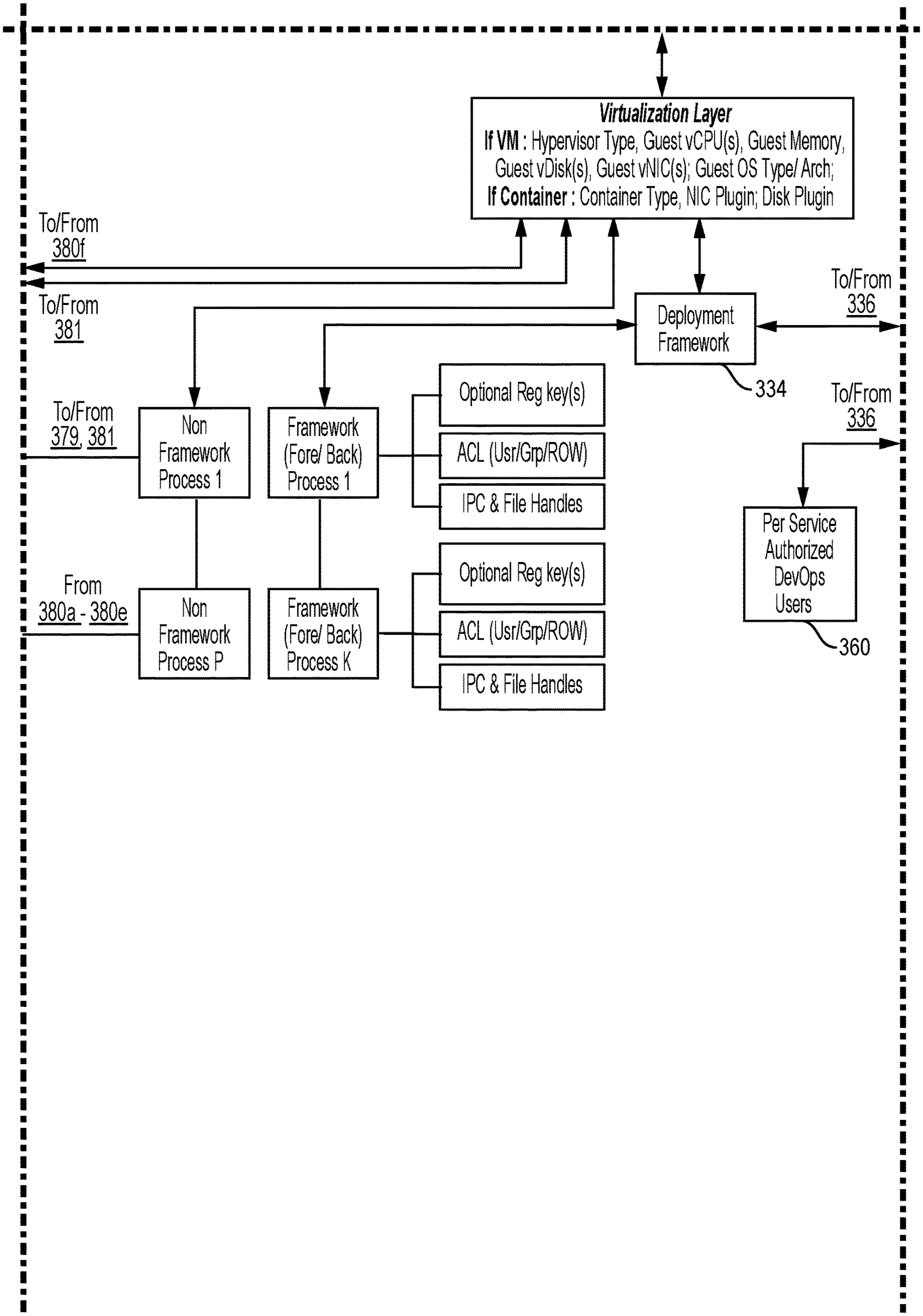
Figure 3:
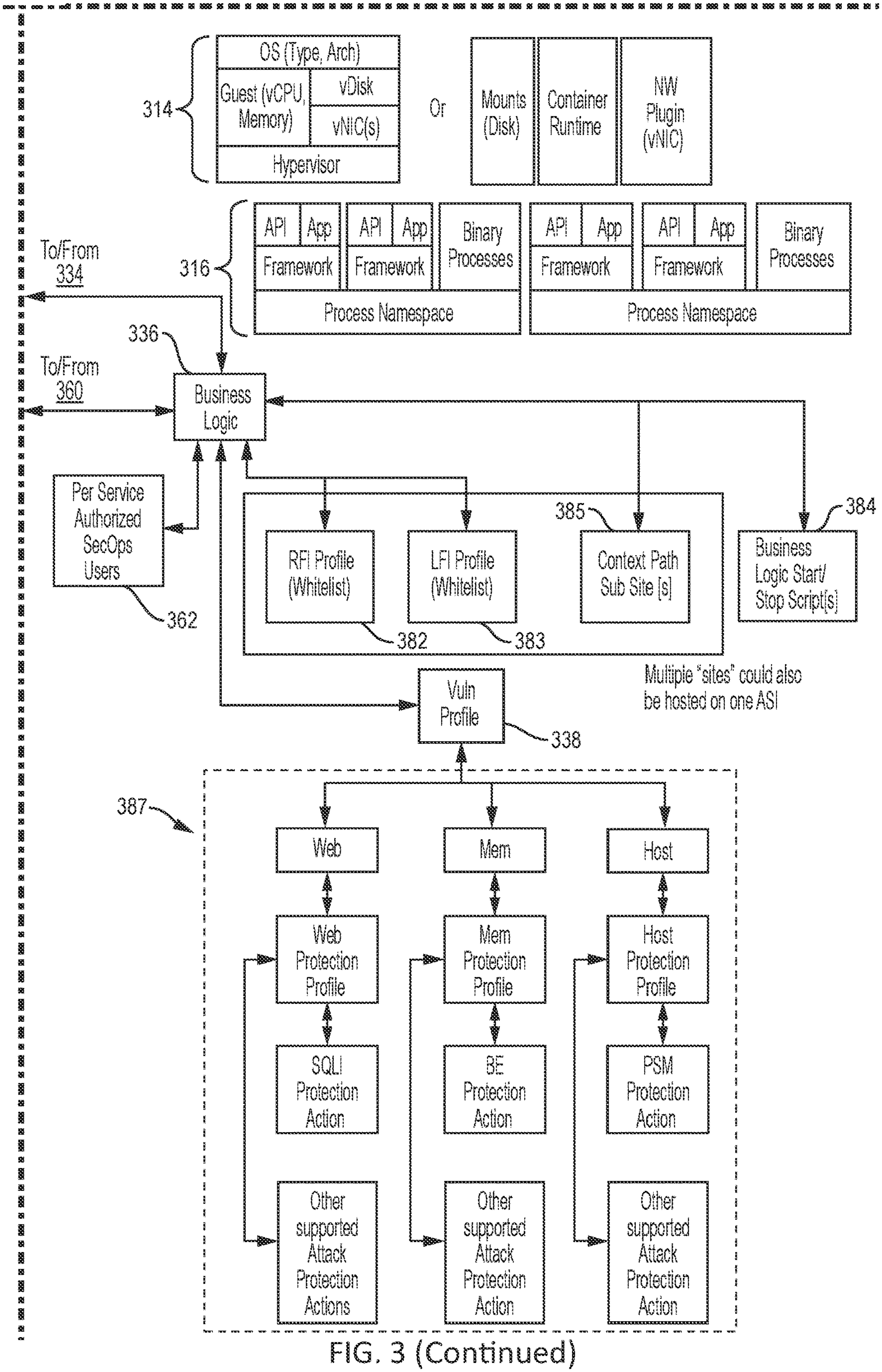

FIG. 3 is a block diagram 320 that represents various network, application, and security components that may be used to create an application-aware software asset inventory according to an embodiment. Such embodiments may include the following components:

4.1 API Database and Server

An API database (DB) 322 and API server 324 are depicted in separate blocks at the top of FIG. 3. The API DB 322 and server 324 provide access to APIs used to manage the application's security environment. These APIs thus enable invocation of protection actions such as rate limiting and rejection of connections from unauthorized users. The API DB 322 contains the latest state of the entire system.

4.2 Auto-Deployment Engine

An auto-deployment engine backend 326 and auto-deployment engine user interface (UI) 328 provide application topology templates for services, deployment frameworks, backend business logic, and vulnerability protection actions. The auto-deployment engine backend 326 and UI 328 can be used to deploy and provision the application and associated security controls in a highly automated manner without human intervention. The auto-deployment engine backend 326 and UI 328 leverage a tool called Application Topology Extraction (ATE) that automatically extracts the information represented in blocks shown below the ASI 310 in FIG. 3. The auto-deployment engine places the information collected by the ATE tool into an ATE DB 330, thus parsing details of the information relating to any new framework(s) 334, service(s) 370, one or more backend business logic instances 336, and vulnerability protection profiles 338 found on the ASI 310. These components can not only be represented automatically in the ATE DB 330 via extraction from the ATE output, but can also be noted manually therein. The aforementioned application topology templates are thereby created and stored in a template DB 332.

4.3 Central Monitoring System and Local File Repository

A central monitoring system (CMS) 340 shows a runtime state of one or more applications running in the user's organization, e.g., enterprise, or a division or business unit thereof. The CMS 340 shows real time security status of the application(s), especially if the application(s) come under attack. A local file repository (LFR) 342 contains software releases of a security solution that may be employed in conjunction with embodiments of the present disclosure. The security solution's code can be released in files of types including, for example, Open Virtual Appliance (OVA), Container Image Registry, RPM Package Manager (RPM), Windows Installer (MSI), etc. When an organization's IT personnel wishes to upgrade the security solution, media required for the upgrade are available in the LFR 342. The LFR 342 may be kept up to date by being configured to sync with a release portal of a provider of the security solution.

4.4 Different Classes of Users and Role-Based Access Control

Different users in an organization may be responsible for deploying, provisioning, monitoring, and troubleshooting various aspects of the software infrastructure.

An organization may have one or more business units 344 and one or more super administrators 346 that manage overall aspects of the CMDB (developed by embodiments). The software infrastructure could be managed by a managed software security provider (MSSP) 348 who may have MSSP staff 350 monitoring individual organizations. A product owner 352 may have one or more applications 354 that the organization may host. The hardware and base software platform 356 of each ASI 310 may be managed by one or more IT operations (IT Ops) users 358. The application deployment framework 334 and backend business logic 336 may be maintained by one or more development operations (DevOps) users 360. The security aspects of the framework 334 and business logic 336 may be maintained by one or more security operations (SecOps) users 362. Finally, application end users may or may not need to register as named users in the application, which may be determined according to the application's functional requirements. The components managed by each aforementioned user type are indicated in a hierarchical manner in FIG. 3.

4.5 Application Infrastructure

Individual applications can be hosted in one or more data centers 364. Some of the data centers 364 may be in a private on-premises cloud or a public cloud provider's data center (such as Amazon's AWS, Microsoft's Azure, or Google's GCP). There may be one or more subnets 366*a*, 366*b* per location, including one or more demilitarized zones (DMZs) 368. Subnets 366*a*, 366*b* may host one or more services 370. Such services 370 can include a legacy application's monolith service or a microservice of a cloud native application. Such services may have two connected aspects—the application's basic backend service 372 and the corresponding security service 374.

The backend service may be implemented using the ASI 310, which can be further broken down into compute instance 312, virtualization 314, and workload 316 layers. The security aspect 374 of the service may be implemented in an analysis engine (AE) 376.

Such services 370 may have their own individual components, such as a deployment framework 334 and business logic 336 that runs in a framework 334 deployed by the service. In addition, the ASI 310 may have one or more processes and services 370 (background or foreground) that provide adjunct services required by the main application. Such processes and services 370 may operate in a dedicated constrained environment including:

a) Zero or more registry keys 378 (if ASI Guest OS is Windows)
b) Access control list (ACL) 379—including user types such as owner, group, and rest of the world, along with the access privileges for each aforementioned type of user. For example, a process may be owned by user "sam" who may be a member of the group "admin."
c) Inter-process communications (IPC) 380*a*—such processes and services may communicate with other processes in the same ASI 310 or other ASIs 310 in the same subnet 366*a*, or a different subnet 366*b* in the same data center 364, or a totally different data center. An IPC database 380*b* may enumerate aspects of network connections (e.g., socket type, address, port, protocol) that an application can establish.
d) Runtime file handles 380*c*—Such processes may read and write various files, such as executables, libraries, configuration files, log files, content files etc. A file handle database 380*d* may enumerate files that the application can legitimately access.

e) Static file handles 380*e*—an import table of a main executable of such processes may indicate libraries to be loaded. It may be possible for a library to need other dependent libraries to be loaded as well. A per-executable library AppMap database 380*f* may enumerate a list of libraries that can be legitimately loaded into the process's memory address space.

f) Allow/deny security policy 381—an allow/deny security policy database may describe command line options, including scripts, that are allowed to run or are explicitly denied. Component representations of such a policy may be referred to as allowlists or denylists as appropriate.

g) Remote file injection (RFI) profile 382—Such a profile may include a database that describes remote connections that a service can establish.

h) Local file injection (LFI) profile 383—Such a profile may include a database that specifies a web root of a web-enabled application, along with files used to implement the application's business logic.

i) Start/stop scripts 384—A database may include records of one or more hierarchical scripts that need to be executed to get the application into an operational state.

j) Context path 385—In a deployment framework, one or more applications can be deployed. This means that a main hosting process (e.g., java.exe for a J2EE framework, w3wp.exe for IIS Server, etc.) can have individual partitions in its monolith process address space. These individual sections in the main address space are designated by a name that may be referred to as a context path. This name is of the application developer's choosing. Such a database enumerates the context path for a given (micro)service.

k) Vulnerability profile 338—Such a profile may include a database that includes records of actions that may be taken when:

k-i) A binary application's memory is corrupted k-ii) An interpreted application's memory is corrupted k-iii) An adjunct process's memory is corrupted, or k-iv) A malicious executable or script gets started l) Protection action database 387—Such a database may enumerate protection action executables or scripts that can be launched for associated protection actions to be triggered.

4.6 Methods of Producing an Application-Aware Inventory of Software Assets

Figure 4:
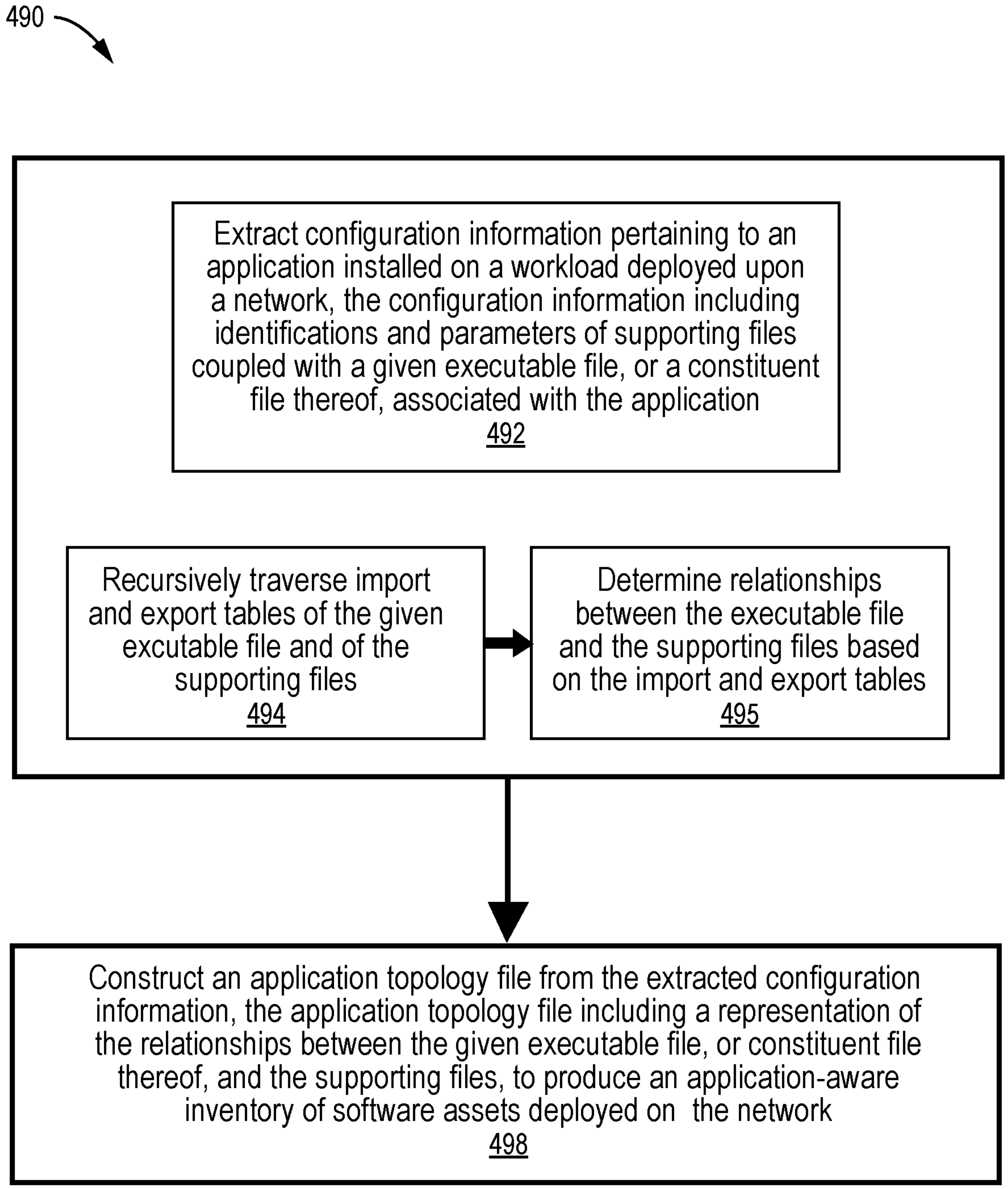
FIG. 4 is a flow diagram depicting an example embodiment of a method for creating an application-aware software asset inventory.

FIG. 4 is a flow diagram illustrating an example embodiment of a method 490 of producing an application-aware inventory of software assets. The method 490 begins by extracting 492 configuration information pertaining to an application installed on a workload deployed upon a network. The extracted configuration information 492 includes identifications and parameters of supporting files coupled with a given executable file, or a constituent file thereof, associated with the application. The extracting 492 includes (i) recursively traversing 494 import and export tables of the given executable file and of the supporting files, and (ii) determining relationships 495 between the executable file and the supporting files based on the import and export tables. According to an embodiment, the extracting 492 is performed by the ATE described hereinabove. The method 490 continues by constructing 498 an application topology file from the extracted 492 configuration information. The constructed 498 application topology file includes a representation of the relationships between the given executable file, or constituent file thereof, and the supporting files, to produce an application-aware inventory of software assets deployed on the network.

Continuing with reference to FIG. 4, in an example embodiment, the supporting files include libraries and scripts installed on the workload for use by the application. In such an embodiment, the libraries may include package files such as, for example RPM, DEB, or MSI files. In such an embodiment, the libraries may also include archive files, such as, for example, TAR, ZIP, or RAR files. In such an embodiment, the package files may be referred to as independent package files, and the supporting files further include dependent package files coupled with the independent package files, such that the dependent package files are also made subject to the extracting 492 of configuration information as described above.

In an example embodiment of the method 490, the parameters of supporting files include at least one of a version identifier, a path, and a checksum. Such a checksum may be configured to cover file types at least including executables, libraries, scripts, and configuration files, to name a few. In some embodiments, the configuration information extracted in step 492 of the method 490 further includes an allowlist. Such an allowlist includes an exception policy covering one or more program files, wherein the one or more program files include at least one of executable files and script files.

In another example embodiment of the method 490, in the application topology file constructed in step 498 of the method 490, the relationships between the given executable file, or constituent file thereof, and the supporting files, as determined in step 495 of the method 490, are represented in a tree structure.

In some embodiments of the method 490, the given executable file is of at least one of a portable executable (PE) format and an executable and linkable (ELF) format. In yet other embodiments, the constituent file of the given executable file is an interpreted code file. In such embodiments, the method further includes reversing code of the interpreted code file prior to extracting the configuration information thereof.

In some embodiments of the method 490, the workload includes multiple workloads deployed upon the network. In some embodiments, the application includes a plurality of applications associated with an organization, such as an enterprise, or a division thereof. In such embodiments, the method 490 further includes recursively repeating the extracting 492 to obtain configuration information for the plurality of applications. In such embodiments, elements of the obtained configuration information correspond to unique manifestations of package files and archive files associated with individual applications of the plurality of applications. In such embodiments, the method 490 further includes updating the application topology file, as constructed in step 498, to include representations of the configuration information for the plurality of applications. An application-aware inventory is thus produced for a plurality of software assets deployed upon workloads deployed in a network utilized by the organization.

In some embodiments, the method 490 further includes recognizing a state of compromised security jeopardizing the application or an aspect thereof. In such embodiments, the state of compromised security may be identified by discovery of evidence of a vulnerability or of an imminent, presently occurring, or recently concluded attack on the application. In such embodiments, the method 490 further includes examining the application topology file to determine one or more appropriate protection actions to launch in response to the recognized state of compromised security.

5. Improvements Over Existing Functionality

Unlike other CMDB functionality that stops at the physical asset level or the software service level, embodiments add a layer of security guardrail configuration tables that help to protect the service at a much more granular level—e.g., in memory, FIFOs, shared memory, pipes, sockets, and files. In addition, embodiments also provide configuration information for ensuring privilege escalation attacks do not occur. Embodiments also provide configuration information for what processes, libraries and scripts are legitimate. Embodiments also provide configuration information for what command line options (including scripts) are legitimate. Embodiments also provide configuration information for which type of user has what kind of access on the various configuration objects.

Figure 5:
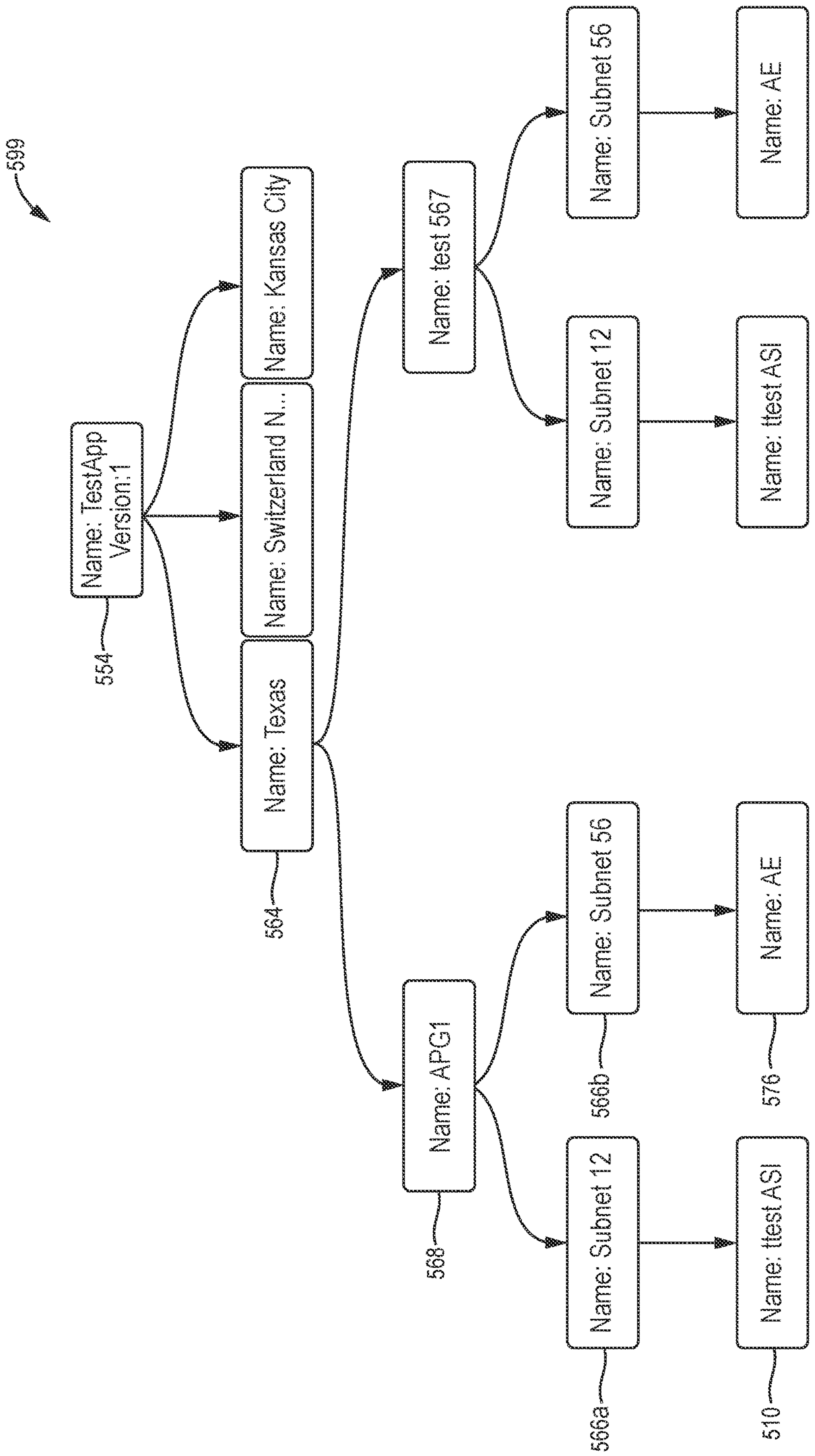
FIG. 5 is a tree diagram representing an application-aware software asset inventory according to an embodiment.

FIG. 5 is a tree diagram 599 presenting examples of configuration information that may be extracted at step 492 of the method 490 described hereinabove in relation to FIG. 4. The configuration information shown in the tree diagram 599 of FIG. 5 relates to the various components of FIG. 3, and is organized within the tree diagram 599 as such. Associated software uses this configuration information to auto deploy, auto provision, and instrument an ASI, e.g., the ASI 310, and application, e.g., the application 354, as needed. This provides a highly automated hands-free experience to the user. Such a tree diagram 599 makes it very easy for a user to add or remove components from the tree to reflect changes made to application topology on the network.

Continuing with respect to FIG. 5, an application 554 can be seen to interface with data centers 564 at various locations, e.g., Texas. The data centers 564, in turn, connect to various subnets 566*a*, 566*b* via DMZ and Application Protection Gateway (APG) modules 568. Finally, ASIs 510 and AEs 576 are shown to be deployed upon the respective subnets 566*a*, 566*b*.

6. Computer and Network Operating Environment

Figure 6:
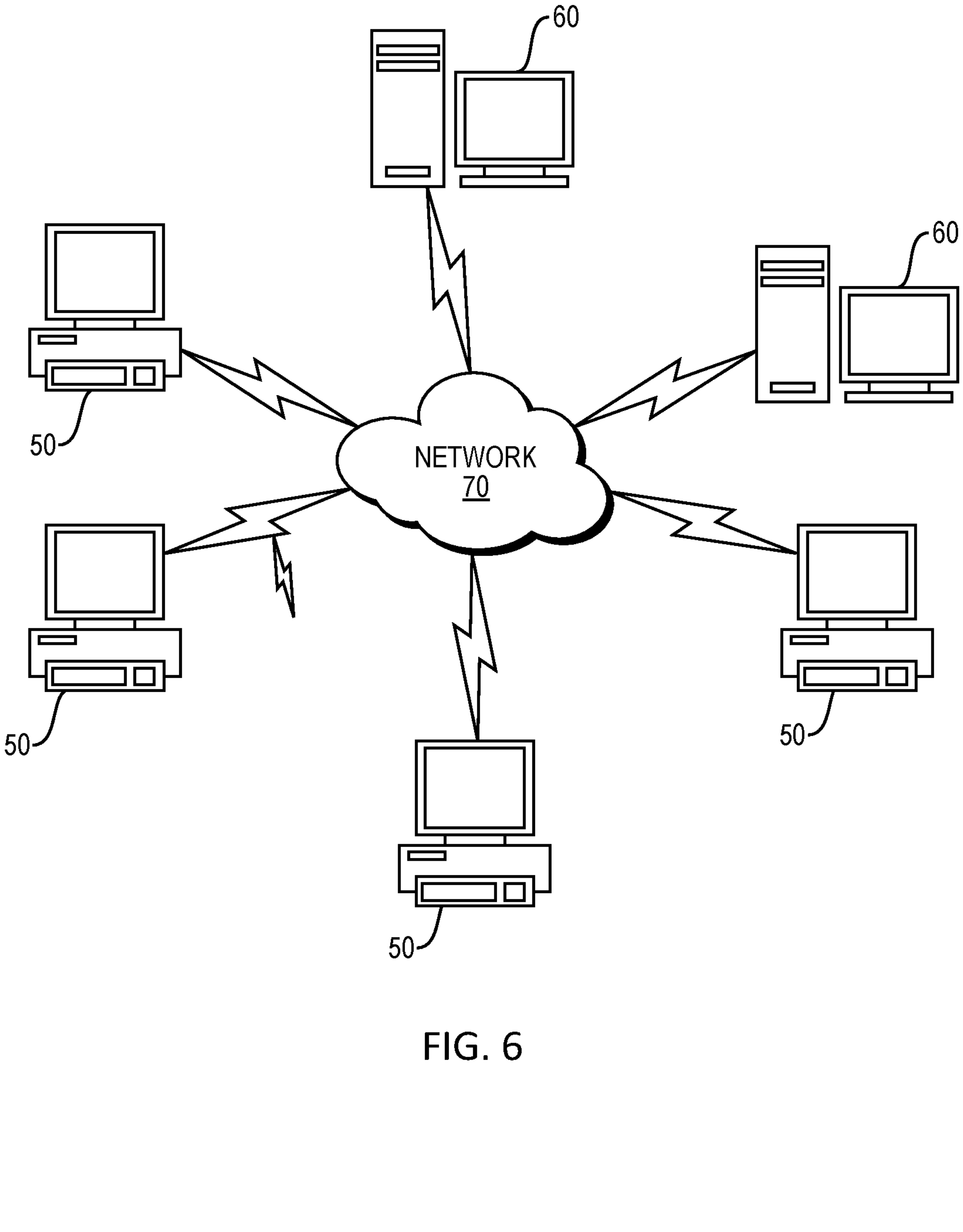
FIG. 6 illustrates a computer network or similar digital processing environment in which embodiments may be implemented.

FIG. 6 illustrates a computer network or similar digital processing environment in which embodiments of the present disclosure may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 7:
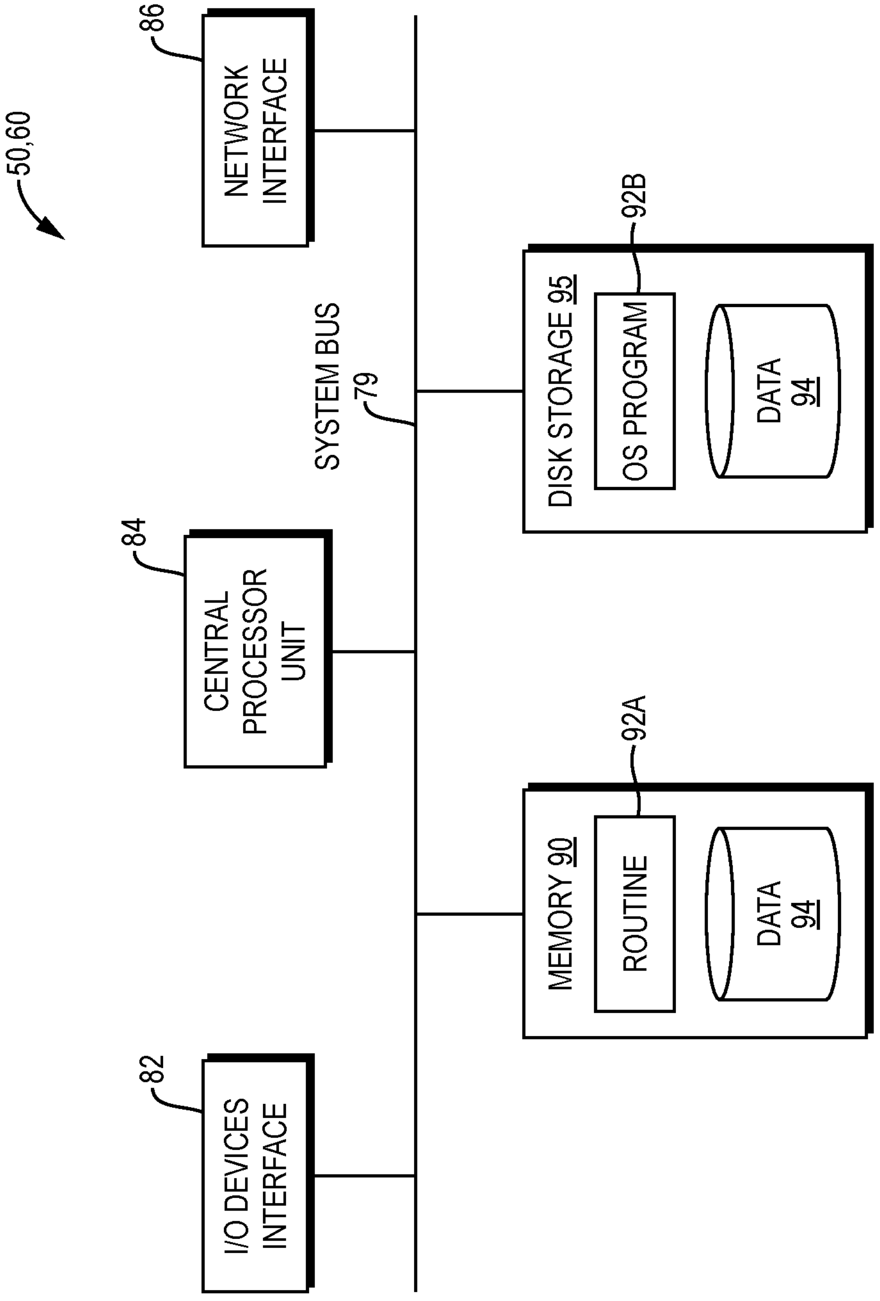
FIG. 7 is a diagram illustrating an example internal structure of a computer in the environment of FIG. 6.

FIG. 7 is a diagram of an example internal structure of a computer (e.g., client processor/device 50 or server computers 60) in the computer system of FIG. 6. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 6). Memory 90 provides volatile storage for computer software instructions 92 (shown in FIG. 7 as computer software instructions 92A and 92B) and data 94 used to implement an embodiment of the present disclosure. Disk storage 95 provides non-volatile storage for computer software instructions 92 and data 94 used to implement an embodiment of the present disclosure. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for an embodiment. The computer program product 92 can be installed by any suitable software installation procedure, as is well known in the art. In another embodiment, at least a portion of the software instructions may also be downloaded over a cable communication and/or wireless connection. In other embodiments, the processor routines 92 and data 94 are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present processor routines/program 92 and data 94.

Embodiments or aspects thereof may be implemented in the form of hardware including but not limited to hardware circuitry, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method of producing an application-aware inventory of software assets deployed on a computer network, the method comprising:

extracting configuration information pertaining to an application installed on a workload deployed upon a network, the configuration information including identifications and parameters of supporting files coupled with a given executable file, or a constituent file thereof, associated with the application, the extracting including: (i) recursively traversing import and export tables of the given executable file and of the supporting files and (ii) determining relationships therebetween, wherein the recursively traversing includes (a) determining a first relationship between the given executable file, or constituent file thereof, and a given supporting file and (b) responsive to determining the first relationship, analyzing the import and export tables to identify a second relationship associated with the given supporting file; and constructing an application topology file from the extracted configuration information, the application topology file including a representation of the relationships between the given executable file, or constituent file thereof, and the supporting files, thereby producing an application-aware inventory of software assets deployed on the network.

2. The method of claim 1 wherein the supporting files include libraries and scripts installed on the workload for use by the application, the libraries comprising package files and archive files, and wherein the package files are independent package files, the supporting files further including dependent package files coupled with the independent package files.

3. The method of claim 1 wherein the parameters of supporting files include at least one of a version identifier, a path, and a checksum.

4. The method of claim 1 wherein the configuration information further includes an allowlist, the allowlist including an exception policy covering one or more program files, wherein the one or more program files include at least one of executable files and script files.

5. The method of claim 1 wherein, in the constructed application topology file, the relationships between the given executable file, or constituent file thereof, and the supporting files are represented in a tree structure.

6. The method of claim 1 wherein the given executable file is of at least one of a portable executable (PE) format and an executable and linkable (ELF) format.

7. The method of claim 1 wherein the constituent file is an interpreted code file and the method further comprises:

reversing code of the interpreted code file prior to extracting the configuration information thereof.

8. The method of claim 1 wherein the workload includes multiple workloads deployed upon the network.

9. The method of claim 1 wherein the application includes a plurality of applications associated with an organization and the method further comprises:

recursively repeating the extracting to obtain configuration information for the plurality of applications, wherein elements of the obtained configuration information correspond to unique manifestations of package files and archive files associated with individual applications of the plurality of applications; and updating the constructed application topology file to include representations of the obtained configuration information for the plurality of applications, thereby producing an application-aware inventory of a plurality of software assets deployed upon workloads deployed in a network utilized by the organization.

10. The method of claim 1 further comprising:

recognizing a state of compromised security jeopardizing the application or an aspect thereof; and examining the application topology file to determine one or more appropriate protection actions to launch in response to the recognized state of compromised security.

11. A system for producing an application-aware inventory of software assets deployed on a computer network, the system comprising:

a processor; and a memory with computer code instructions stored thereon, the processor and the memory, with the computer code instructions, being configured to cause the system to:

extract configuration information pertaining to an application installed on a workload deployed upon a network, the configuration information including identifications and parameters of supporting files coupled with a given executable file, or a constituent file thereof, associated with the application, the extracting including: (i) recursively traversing import and export tables of the given executable file and of the supporting files and (ii) determining relationships therebetween, wherein the recursively traversing includes (a) determining a first relationship between the given executable file, or constituent file thereof, and a given supporting file and (b) responsive to determining the first relationship, analyzing the import and export tables to identify a second relationship associated with the given supporting file; and construct an application topology file from the extracted configuration information, the application topology file including a representation of the relationships between the given executable file, or constituent file thereof, and the supporting files, thereby producing an application-aware inventory of software assets deployed on the network.

12. The system of claim 11 wherein the supporting files include libraries and scripts installed on the workload for use by the application, the libraries comprising package files and archive files, and wherein the package files are independent package files, the supporting files further including dependent package files coupled with the independent package files.

13. The system of claim 11 wherein the parameters of supporting files include at least one of a version identifier, a path, and a checksum.

14. The system of claim 11 wherein the configuration information further includes an allowlist, the allowlist including an exception policy covering one or more program files, wherein the one or more program files include at least one of executable files and script files.

15. The system of claim 11 wherein, in the constructed application topology file, the relationships between the given executable file, or constituent file thereof, and the supporting files are represented in a tree structure.

16. The system of claim 11 wherein the given executable file is of at least one of a portable executable (PE) format and an executable and linkable (ELF) format.

17. The system of claim 11 wherein the constituent file is an interpreted code file and wherein the processor and the memory, with the computer code instructions, are further configured to cause the system to:

reverse code of the interpreted code file prior to extracting the configuration information thereof.

18. The system of claim 11 wherein the workload includes multiple workloads deployed upon the network.

19. The system of claim 11 wherein the application includes a plurality of applications associated with an organization and wherein the processor and the memory, with the computer code instructions, are further configured to cause the system to:

recursively repeat the extracting to obtain configuration information for the plurality of applications, wherein elements of the obtained configuration information correspond to unique manifestations of package files and archive files associated with individual applications of the plurality of applications; and update the constructed application topology file to include representations of the obtained configuration information for the plurality of applications, thereby producing an application-aware inventory of a plurality of software assets deployed upon workloads deployed in a network utilized by the organization.

20. The system of claim 11 wherein the processor and the memory, with the computer code instructions, are further configured to cause the system to:

recognize a state of compromised security jeopardizing the application or an aspect thereof; and examine the application topology file to determine one or more appropriate protection actions to launch in response to the recognized state of compromised security.

21. A computer program product for producing an application-aware inventory of software assets deployed on a computer network, the computer program product comprising:

one or more non-transitory computer-readable storage devices and program instructions stored on at least one of the one or more storage devices, the program instructions, when loaded and executed by a processor, cause an apparatus associated with the processor to:

extract configuration information pertaining to an application installed on a workload deployed upon a network, the configuration information including identifications and parameters of supporting files coupled with a given executable file, or a constituent file thereof, associated with the application, the extracting including: (i) recursively traversing import and export tables of the given executable file and of the supporting files and (ii) determining relationships therebetween, wherein the recursively traversing includes (a) determining a first relationship between the given executable file, or constituent file thereof, and a given supporting file and (b) responsive to determining the first relationship, analyzing the import and export tables to identify a second relationship associated with the given supporting file; and construct an application topology file from the extracted configuration information, the application topology file including a representation of the relationships between the given executable file, or constituent file thereof, and the supporting files, thereby producing an application-aware inventory of software assets deployed on the network.

* * * * *